United States Patent [19]

Buller et al.

[11] Patent Number: 4,941,533

[45] Date of Patent: Jul. 17, 1990

[54] SUBTERRANEAN PERMEABILITY MODIFICATION BY USING MICROBIAL POLYSACCHARIDE POLYMERS

[75] Inventors: Clarence S. Buller; Shapour Vossoughi, both of Lawrence, Kans.

[73] Assignee: The University of Kansas, Lawrence, Kans.

[21] Appl. No.: 352,733

[22] Filed: May 16, 1989

[51] Int. Cl.$^5$ .................... E21B 33/138; E21B 43/22; E21B 43/27; E21B 47/00

[52] U.S. Cl. .................... 166/252; 166/246; 166/270; 166/271; 166/273; 166/294; 166/300

[58] Field of Search ............... 166/246, 252, 270, 271, 166/273, 274, 275, 281, 292, 294, 295, 300; 252/8.554; 530/130, 132; 536/114

[56] References Cited

U.S. PATENT DOCUMENTS

| | | | |
|---|---|---|---|
| 2,747,670 | 9/1956 | King et al. | 166/270 |
| 2,903,065 | 9/1959 | Holbrook et al. | 166/292 X |
| 3,208,518 | 9/1965 | Patton | 166/246 |
| 3,372,748 | 3/1968 | Cook | 166/246 |
| 3,404,734 | 10/1968 | Raifsnider et al. | 166/270 X |
| 4,384,044 | 5/1983 | Kim et al. | 166/246 X |
| 4,413,680 | 11/1983 | Sandiford et al. | 166/270 |
| 4,548,268 | 10/1985 | Stipanovic | 166/246 X |
| 4,569,393 | 2/1986 | Bruning et al. | 166/270 |
| 4,658,898 | 4/1987 | Paul et al. | 166/270 |
| 4,670,550 | 6/1987 | Bleeker et al. | 252/8.554 X |

OTHER PUBLICATIONS

Hampel et al, *Glossary of Chemical Terms*, 2nd edition, Van Nostrand Reinhold Company, 1982, p. 129.

*Primary Examiner*—George A. Suchfield
*Attorney, Agent, or Firm*—Hovey, Williams, Timmons & Collins

[57] ABSTRACT

A secondary oil recovery process is disclosed involving the injection of a polysaccharide polymer naturally produced by certain bacteria in a solubilized form into the oil sand or horizon. When such polymer is injected, it is solubilized in alkali solution such as sodium hydroxide. Within the formation, the polysaccharide polymer may be precipitated by the later injection of an acid solution or carbon dioxide. The order of injection of the acidic materials and the solubilized polymer is not critical, except with respect to carbon dioxide injection, which must follow the solubilized polymer injection. The gelling or the precipitation of polymer in the formation takes place preferentially in the higher permeability zones, such perhaps already wet with water. By such precipitation, the high permeability zones are selectively blocked off, giving sweep access primarily to the lower permeability zones containing mostly oil. The solubilized polymer may be used as a secondary recovery sweep liquid, per se. The solubilized precipitatable polymer solution may also be used as a consolidator (upon gelling or precipitation) of eroding or loose wellbores and such like oil sands surrounding wellbores. By alternating acidic solution/$CO_2$ injection with further injection of basic solution or basic polymer solution the polymer body injected into the oil sand can be precipitated in a particular zone, thereafter resolubilized and then re-precipitated elsewhere and so forth. Sequential slugs of acid/solubilized polymer may be injected in any order.

105 Claims, 3 Drawing Sheets

SUBTERRANEAN PERMEABILITY MODIFICATION BY USING MICROBIAL POLYSACCHARIDE POLYMERS

BACKGROUND OF THE INVENTION

As herein and elsewhere disclosed, a strain of aerobic bacteria has been isolated which encapsulate themselves, from which a bio-polymer can be extracted. Neutralization of the alkaline extract with mineral acids, organic acids or $CO_2$ results in gel formation. Polymer in hydrated gel is resistant (and tolerant) to repeated cycles of redissolving in alkali followed by precipitation by acid or $CO_2$. The subject invention sets forth the feasibility and methods of using this microbial polymer for permeability modification and reversible blocking of undesirable flow channels in petroleum sands, horizons and reservoirs.

Most of the Kansas, for example, and many elsewhere, oil reservoirs have already been water flooded in secondary recovery. The water/oil ratio in most of them has already reached or passed the economic level. Therefore, devising and providing a technique which will selectively and reversibly plug the water channels has great economic prospects. Our invention establishes that the bio-polymer has potential for application in microbially enhanced oil recovery (EOR). The potential and capacity for generating the reversibly gellable (in situ) polymer from inexpensive, renewable cellulosic, hemicellulosic or cornstarch stocks greatly enhances the economic feasibility and usefulness of the subject process.

Permeability modification has been a subject of interest since the introduction of water-flooding as a secondary oil recovery technique. Because of the inevitable variations in the reservoir's permeability, bypassing of the displaced fluid by the displacing fluid is unavoidable even in the most homogeneous reservoir. Early breakthrough of the displacing fluid causes the secondary recovery (typically water drive) project to become uneconomical and leaves a large portion of the initially present oil in place behind and unrecovered.

Several processes such as injection of polymer solution (1) or cross linking of polymers (2) in situ in the reservoir (in situ gelation) have been developed and are presently under investigation. The difficulty arises when deep penetration is required. Near well-bore treatment is easier to achieve than treatments requiring deep penetration of the reservoir.

Clearly, it is desirable to devise a method and/or process which is time independent and reversible. In such case, materials could be injected as far in the reservoir as desired, then be activated to gel. Process reversibility would allow breaking the first in situ gel, moving it further down in (through) the reservoir and then repeating the gelation process again. One objective of the subject method and process is to disclose and provide the feasibility of such a technique using a reversible gel generated by a bio-organism.

The in situ growth of anaerobic and/or aerobic bacteria and the accumulation of the products of their growth have been considered for use in enhanced oil recovery (EOR) processes (3). Products of anaerobic bacterial growth which may enhance flow characteristics of in situ oil include gases such as carbon dioxide and methane, solvents such as ethanol or butanol, and acetic, propionic, or butyric acid. Potentially useful products of aerobic bacteria growth include surfactants (4) produced by hydrocarbon oxidizing bacteria and polysaccharide gums (5) which increase the viscosity of water.

In addition to problems attendant to the creation of environments suitable for the in situ growth of bacteria, the biomass may eventually accumulate in amounts sufficient to cause clogging. Problems involved in the in situ use of bacteria may be contrasted with the relative ease with which desirable microbial products can be produced in large scale cultures. Such products can then be injected into the wells. One such product is xanthan, a polysaccharide polymer which is injected into wells in order to increase the viscosity of water (5).

The subject method and process demonstrates and discloses the feasibility of using microbial polymers capable of gel formation for reversible blocking of undesirable channels. It focuses on bacterial polymers which can reversibly form gels. Such particular polymers can readily be obtained from a certain newly isolated strain of cellulolytic bacteria as well as some such bacteria previously known and further some unrelated bacteria as set forth herebelow.

References (1) White, J. L., et al *"Use Of Polymers To Control Water Production In Oil Wells"*, J. Pet. Tech. (Feb. 1973) 143.

(2) Willhite, G. P., et al *"Alteration Of Permeability In Porous Rocks With Gelled Polymers"*, Polymer Preprints, 22 (1981) 53.

(3) Knapp, R. M., et al, *"The Use Of Micro-Organisms In Enhanced Oil Recovery"*, DOE Annual Report, Oct. 1982-Dec. 1984 (1985).

(4) Javaheri, J., et al *"Anaerobic Production Of A Biosurfactant By Bacallus Licheniformis Strain J. F-2"*, Appl. Environ. Microbiol. (1985)

(5) Perry, B. *"Performance History On Use Of Biopolymer In Southern Oklahoma"*, SPE. Paper 4085 (Oct. 1972) 47th Annual Fall Meeting.

(6) Aslam, S. et al *"Viscometric Measurement Of Chromium (III)-Polyacrylamide Gels By Weissenberg Rheogonimeter"*, SPE. 12639, presented at the SPE/DOE Fourth Symposium On Enhanced Oil Recovery, Tulsa, Okla. April 5-18, (1984).

(7) Harada, et al; Curdlan: A Bacterial Gel Forming B-1,3-Glucan Arch-Biochem Biophys 124:298 (1968).

(8) Nakanishi et al; Demonstration Of Curdlan-Type Polysaccharide and Some Other B-1,3 Glucan Microorganisms With Aniline Blue J. Gen. Appl. Microbiol. 22:1-11 (1976).

Test Example/Procedure

A simple experimental setup similar to that shown in FIG. 4 has been and can be used in laboratory experimental investigations. The main components are a pump, pressure transducers, fraction collector and sand core or sandpack. The sandpack is initially saturated with brine. The permeability of the bed is determined, knowing the pressure drop and the brine flow rate. Porosity of the bed is determined by knowledge of the volume of the sand pack, the weight of the sand and its density. The brine is then displaced by oil to its connate water saturation. Water-flood is established and the oil recovery is monitored. Water-flood is continued until a predetermined water-oil ratio is achieved. At this stage, the permeability modification scheme is or can be instituted as follows.

Water is switched to a solution of the bio-gel dissolved in sodium hydroxide. This solution is injected into the sand pack until at least the first segment of the core or sand pack is flooded. This is determined by the pressure drop reading of the first segment compared to the rest of the sand pack. The difference in the pressure drop reading is due to the difference in the viscosity of the bio-gel solution with respect to that of the brine.

The injection of the bio-gel solution may be stopped at this stage and switched to an acidic solution or gas such as hydrochloric acid, acetic acid or $CO_2$. Alternatively, a quantity of water or brine may be next injected. Gelation starts in the first segment (or thereabouts) of the sand pack because of the direct or delayed mixing of the acidic solution or $CO_2$ with the bio-gel solution already residing in that segment. This is detected by increased pressure drop readings because of the partial plugging caused by the precipitated gel.

Input of the acid solution is then switched to input of NaOH per se or the polymer containing sodium hydroxide solution. The gel breaks in presence of the sodium hydroxide or the NaOH with solubilized polymer, at least in part, and produces the more dilute biopolymer solution. Injection of the sodium hydroxide or NaOH polymer solution is continued until the resolubilized bio-gel solution reaches the second or third segment of the sand pack. Input of sodium hydroxide is then switched back to input of the acid solution or $CO_2$ to observe the recurrence of the gelation in the second or third segment of the sand pack.

Alternatively, the acid solution is first injected into the core followed by injection of the polymer solution before or after nonacidic water injection. This order of events will not work with $CO_2$.

The sequential injection of the acid and sodium hydroxide polymer solution (or vice versa, including optional use of $CO_2$) is continued until the bio-gel solution is produced from the exit end of the sand pack. The use of this method and process produces significantly higher oil recovery. Such recovery depends on how well the water bypassing channels are plugged during the period of gelation and gel recurrence.

BRIEF DESCRIPTION OF THE INVENTION

The basic subject matter here is permeability modification by changing the physical polymer from an alkali soluble state to a water insoluble gel state.

Recoverable oil-in-place is directly proportional to the volume of the reservoir which is swept by the injected fluids. The volumetric sweep efficiency can be effected by any one, several or all of: (a) the properties of the injected or displaced fluids, (b) their interaction with the porous rock and (c) the heterogeneity of the porous rock. Therefore, increase in volumetric sweep efficiency can be expected if alteration in any of the above properties is achieved in the desired direction.

Different attempts, with partial success, have been made in arriving at higher volumetric sweep efficiency goals. However, the outcome of the presently known techniques is far from being satisfactory. Therefore, the effort is still going on to produce a simple and cost effective process capable of achieving the goal of enhancing oil production beyond the primary and secondary stages. The subject invention is aimed in that direction.

Looking at the present state of the art, the topic of oil sand permeability modification is an active research area. There have been many attempts to control fluid movement in the reservoirs in order to improve sweep efficiencies or to reduce water production rates in water-flooding. Usually, some kind of polymers have been added to the displacing fluid to reduce its mobility. Early polymer treatments involve simply the injection of polymer, and are referred to as polymer flooding or polymer augmented water flooding. Although the technique works to some extent, there are many reservoirs that do not benefit from polymer flood. Some of the factors responsible for such failures are (a) polymer degradation due to mechanical shear, (b) high salinity of injected or resident water and (c) the existence of fractures or large permeability variations. In addition, polymer retained by absorption or mechanical entrapment has a tendency to be washed from the porous rock over a long period of time. Thus, retention of polymer cannot produce sufficient permeability reduction over desirable periods of time for many reservoirs.

More recent processes have aimed to produce large permeability reductions in porous media, involving cross linking or in-situ gelation of polymers. A typical gelled polymer process involves the reaction of a polymer with a metal ion to yield a 3-dimensional cross-linked system. Mixtures with different gelation times can be provided, based on the concentration of the mixture, temperature, pH and other physical and chemical properties. Such techniques, although theoretically possible and sometimes producing satisfactory results in the laboratory, fail in most of the field applications. Difficulty particularly arises when deep penetration of the oil sand or formation is required. Near well-bore treatment is easier to achieve than the treatment requiring deep penetration in the reservoir. The failure is mostly due to the complexity of the process in which a large number of variables are involved. Controlling these variables, such as concentration of the metal ions, polymer, reducing agent, etc., at the necessary field scale is at best extremely difficult, if not impossible.

It is, therefore, desirable to devise a process which is time independent and reversible. Thus, initial gelable materials in solution can be injected as far into the reservoir as desired, such then to be activated to gel. Process reversibility would allow breaking the gel thereafter (resolubilizing) and moving the initial charge of materials further down in or through the reservoir, where the gelation process may again be repeated. It is an object of this invention to provide such a simple technique involving the least number of variables. Since the gelation process in this method and procedure is not a chemical reaction, but, rather, a change in the physical state, i.e. physical morphology, gelation can be postponed, upon injection of the gelable fluid in the reservoir, as long as or as far into the reservoir as desired.

The preferred polymer that should be used in this new process and method is a water insoluble beta 1,3 polyglucan homopolymer. It is produced by a new strain of *Cellulomonas flavigena*. The polymer producing strain was selected from chemostat cultures in which ammonium chloride was the growth limiting substrate. When the polymer is produced, it is stored as a capsule which surrounds the bacteria. The polymer itself has been determined to be a polysaccharide. Under optimal growth conditions, as much as 90% of the dry weight of encapsulated bacteria can be accounted for as polysaccharide.

The polymer is completely soluble in 1 N Na OH. When its solutions are neutralized with any of mineral or organic acids or $CO_2$, a water insoluble gel is formed.

Polymer in hydrated gel is resistant to (amenable to) repeated cycles of redissolving in alkali followed by precipitation by acid or $CO_2$. If the gel is macerated and diluted in water, then subjected to centrifugal forces of 16,000 g for 15 minutes, 97% of the weight of the precipitated gel is accounted for as water.

Polymer solution, even in dilute form, exhibits much higher viscosity than plain water or dilute sodium hydroxide.

Turning to narrative statements of aspects of the subject invention, it has been discovered that two of the inherent physical properties associated with the above polymer can be taken advantage of in enhancing oil production from subterranean oil sands or reservoirs. These two properties are (a) increased solution viscosity in dilute state and (b) reversible gel formation of the alkaline solution by acid titration. The subject invention is directed to all aspects of oil reservoir treatment wherein the above and below mentioned polymer may be used in one form or another. Some of the more explicit applications are herein described below.

(1) Alkaline-Polymer Flooding. The polymer being soluble in alkaline solution makes it an attractive additive to the alkaline flooding. Since the viscosity of the alkaline solution is significantly increased, it provides much more favorable mobility ratios which, per se, enhance sweep efficiency. The technique can be used as a straight polymer flood, if such is cost effective, or as (a) slug(s) with or without (a) buffer zones. Alkaline-polymer floods disclosed here have the advantage of both the alkaline flood, as well as polymer flood. Such may be referred to as "polymer augmented caustic flood".

(2) Permeability Modification. Perhaps the most important factor which effects volumetric sweep efficiency in secondary oil recovery (water flood) is the variation of rock permeability with respect to spatial position in the reservoir. Reservoir rock is frequently heterogeneous and sometimes anisotropic. Permeability typically varies both areally (horizontally) and vertically in and across the sand. The largest changes commonly occur in the vertical cross section, due to variations in depositional environment during the ancient formation of the reservoir rock. When there are large differences in permeability in the vertical cross section, injected fluids tend to flow into and in those regions with highest permeability, bypassing portions of the reservoir which have lower permeability. A very significant quantity of oil remains in these bypassed or unswept regions at the time operation of the secondary recovery displacement process becomes uneconomical.

The present invention provides simple and effective techniques to modify the permeability heterogenity of oil horizons and sands and to block the already (water flooded) swept zones. In a first form of this approach, the pH of the displacing fluids, i.e. water in most cases, is reduced below the pH required for the polymer solution to gel. Injection of the altered-pH water may be continued until it is detected in the production well. Injection is then switched to fresh water (if it is necessary) to insure that the flow lines and the near wellbore zone are free from acidic solution. Injection of polymer in alkaline solution is then undertaken. Polymer solution will gel upon contact with the acid solution blocking the already swept zone(s).

Although the above approach (which guarantees substantially complete blockage of the water-invaded zone) is one of the two most effective approaches, see below, in some instances it may be desirable to alternate the treatment to make it cost effective. In this approach, injection of the acid, fresh water and alkaline-polymer solution are repeatedly made in the noted sequence to minimize the required quantities of injections of the acid and alkaline-polymer solutions. In this approach, there will be no need for monitoring the produced water from the production well and the effect of higher oil production (better oil-water ratio at the production well(s)) should be felt sooner, which could be a desirable factor.

In another yet alternative approach, the injection order acid/polymer solution sequence can be reversed, with no loss in effectiveness and the gain that $CO_2$ may be used as the neutralizing, precipitating agent. That is, alkaline-polymer solution can be injected first, followed by fresh water or brine, if such necessary to clear the flow lines and near wellbore zone, then acidic water or $CO_2$ may be injected. The already positioned polymer solution, presumably at least partly located in the water flooded thief or high permeability zone(s) will gel upon receiving or contacting the acidic water or $CO_2$ being injected which will force and/or redirect any thereafter used displacing fluid (such as water flood, polymer flood, etc.) into the residual oil containing formation zone(s).

(3) Improvement In Sweep Efficiency. The procedures described above are well suited for even the most homogeneous reservoirs. Intrusion of displacing fluid into displaced fluid zones is not because of the heterogeneity of the rock alone, but also because of the relative viscosities of the fluids involved. Viscous fingering, gravity segregation or tongueing are such examples.

(4) Channel Blocking. Very large permeability contrast in oil sands and formations which have been water flooded in secondary oil recovery produce and result in channels of displacing fluid from injection to production well(s). These can be in form of fractures, thief zones or simply high-permeability zones. Channel detection can be easily achieved by a simple tracer test. The time of tracer detection in the production well is typically very short. Channel blocking can be simply achieved by applying the same techniques as those described in item (2) Permeability Modification set forth above.

(5) Inhibition Of Sand Production In Open Hole Completion. One of the major difficulties in open-hole completion of unconsolidated or poorly consolidated sand stone reservoirs, is sand production, per se. Sand production can be detrimental to the production well as well as in-line and surface equipment. Artificial cementation can be achieved in near well-bore treatment by first injecting acid solution, then alkaline-polymer solution (or vice versa also including $CO_2$). In situ gelation of the polymer solution provides artificial cementation which will inhibit objectionable sand production. Sufficient flow channels into the reservoir from the wellbore can be created simply by subsequent injection of alkaline solution.

Other improvements will be set forth hereinabove and hereinbelow.

The distinctive features of the present invention in comparison with prior art (former) in situ gellation processes can be elaborated. Thus, as mentioned earlier, this is not a cross linking process, but a change in physical morphology due to the reduction of pH. pH is the only variable involved in precipitating polymer from alkaline solution, which process does not require such to be monitored but just requires that the alkaline polymer solutions be lowered to neutrality. The process is time independent and requires no skilled operator to be successful in use. More importantly, it is reversible. An already gelled zone can be washed by alkaline solution, thus resolubilizing the gelled polymer, and such fluid be moved to lower or deeper regions in the reservoir by fluid drive thereof, then the solution gelled again by injecting acidic solution or $CO_2$ where the latter is called for. The repeated solubilize/gel cycles do not effect the strength or the effectiveness of the gelation process.

The polymers used in this invention have never been used in this type of application nor in any application in the subterranean oil reservoirs, to the best of our knowledge.

References

Ford, W. O. and Kelldorf, W. F. N., "Field Results Of A Short Setting Time Polymer Placement Technique", SPE 5609, presented at the 50th Annual Fall Meeting of the SPE, Dallas, September 28–October 1, 1975.

McLaughlin, H. C., Diller, J and Ayres, H. J., "Treatment Of Injection and Producing Wells With Monomer Solution", SPE 5364 presented at the Oklahoma City SPE Regional Meeting, March 24–25, 1975.

Smith, L. R., Fast, C. R., and Wagner, O. R., "Development and Field Testing of Large Volume Remedial Treatments for Gross Water Channelling", J. Pet. Tech. (August, 1969) p. 1015.

Barkman, J. H. and Davidson, D. H., "Measuring Water Quality And Predicting Well Impairment", J. Pet. Tech. (July, 1972) p. 865.

Thomeer, J. H. and Abrams, A., "A Shallow Plugging-Selective Re-Entry Technique For Profile Correction", J. Pet. Tech. (May, 1977) p. 571.

Knapp, R. H. "Asphalt Plugging Emplacement Process", U.S. Pat. No. 3,901,316 (Aug. 26, 1975).

Chang, H. L., "Polymer Flooding Technology, Yesterday, Today and Tomorrow", J. Pet. Tech. (August, 1978) p. 1113.

Jewett, R. L. and Schurz, G. F., "Polymer Flooding—A Current Appraisal", J. Pet. Tech. (June, 1970) p. 675.

Thomas, C. P., "The Mechanism Of Reduction Of Water Mobility In Glass Capillary Arrays", Soc. Pet. Eng. J. (June, 1976) p. 130.

Needham, R. B., Threlkeld, C. B. and Gall, J. W., "Control Of Water Mobility Using Polymers And Multivalent Cations", SPE 4747 presented at the Third Symposium On Improved Oil Recovery, Tulsa, April 22–24, 1974.

Gall J. W., "Subterranean Formation Permeability Correction", U.S. Pat. No. 3,762,476 (Oct. 2, 1973).

Clampitt, R. L. and Hessert, J. E. "Method For Controlling Formation Permeability", U.S. Pat. No. 3,785,437 (Jan. 15, 1974).

Clampitt, R. L. and Reid, T. B., "An Economic Polymerflood In The North Burbank Unit, Osage County, Okla.", SPE 5552, presented at the SPE 50th Annual Fall Meeting, Dallas, Sept. 25–Oct. 1, 1975.

Sparlin, D., "An Evaluation Of Polyacrylamides For Reducing Water Production", SPE 5610 presented at the 50th Annual Fall Meeting of the SPE, Dallas, Sept. 28–Oct. 1, 1975.

Mazzocchi, E. F. and Carter, K. M., "Pilot Application Of A Blocking Agent-Weyburn Unit, Saskatchewan", J. Pet. Tech. (September, 1974) p. 973.

Felber, B. J. and Dauben, D. L., "Laboratory Development Of Lignosulfonate Gels For Sweep Improvement", Soc. Pet. Eng. J. (December 1977) p. 391.

Hessert J. E. and Fleming, P. D., "Gelled Polymer Technology For Control Of Water In Injection And Production Wells", presented at Third Tertiary Oil Recovery Conference, Wichita, Apr. 25–26, 1979.

Sandifor, B. B. and Graham, G. A., "Injection Of Polymer Solutions In Producing Wells", presented at 71st National Meeting Of AIChE, Feb. 20–23, 1972.

White, J. L., Goddard, J. E., and Phillips, H. M., "Use Of Polymers To Control Water Production In Oil Wells", J. Pet. Tech. (February 1973) p. 143.

Dabbous, M. K. and Elkins, L. E., "Preinjection Of Polymers To Increase Reservoir Flooding Efficiency", SPE 5836 presented at the SPE-AIME Symposium On Improved Oil Recovery, Tulsa, Mar. 22–24, 1976.

Fitch, J. P. and Canfield, C. M., "Field Performance Evaluation Of Crosslinked Polymers To Increase Oil Recovery In The Wilmington Field, Calif.", SPE 5366 presented at the 45th Annual California Regional Meeting Of The SPE, Ventura, Apr. 2–4, 1975.

Terry R. E., Huang, C-G, Green, D. W., Michnick, M. J. and Willhite, G. P., "Correlation Of Gelation Times For Polymer Solutions Used As Mobility Control Agents", SPE 8419 presented at the 54th Annual Fall SPE Meeting, Las Vegas, Nev., Sept. 23–26, 1979.

Bolton, H. P., Carter, W. H. Kamdar, R. S., and Nute, A. J., "Selection Of Polymers For The Control Of Mobility And Permeability Variation At Richfield East Dome Unit, Orange County, Calif.", SPE 8893 presented at the 50th Annual California Regional Meeting of the SPE, Los Angeles, Calif., Apr. 9–11, 1980.

Martin F. D., and Konarik, F. S., "Chemical Gels For Diverting $CO_2$: Baseline Experiments," SPE 16728 presented at 1987 SPE Annual Technical Conference and Exhibition, Dallas, Tex., Sept. 27–30, 1987.

Mumallah, N. A., "Chromium (III) Propionate: A Crosslinking Agent For Water-Soluble Polymers In Real Oilfield Waters," SPE 15906 presented at 1987 SPE International Symposium On Oilfield Chemistry, San Antonio, Tex., Feb. 4–6, 1987.

Hodge, R. M. and Baranet, S. E., "Evaluation Of Field Methods To Determine Crosslink Time Of Fracturing Fluids," SPE 16249, Ibid.

Nanda, S. K., Kumar, R., Sindhwani, K. L. and Goyal, K. L., "Characterization Of Polyacrylamine-cr$^{+6}$ Gels Used For Reducing Water/Oil Ratio," SPE 16253, Ibid.

In-Situ Gellation Induced By Carbon Dioxide

(a) Enhanced Oil Recovery Processes

The initial stage in producing oil from a reservoir is called primary production. Production at this stage is achieved by natural reservoir energy. Examples of natural driving energy are gas which evolves from solution out of the oil, expansion of free gas, or gravity drainage.

Most of a reservoir's oil remains in place after the natural energy therein is depleted. Natural energy depletion can be augmented by thereafter injecting gas and/or water. Oil recovery processes which use these fluids are typically called "secondary recovery" methods Water injection is commonly known as "water flooding" and natural gas injection is often termed "pressure maintenance".

Approximately two-thirds of the original oil in place will remain in an average reservoir after both primary and secondary production phases. Processes that involve the injection of fluids other than natural gas and water have been called "enhanced oil recovery" processes (EOR). These processes could be employed as secondary or tertiary schemes. Enhanced oil recovery methods can be divided into three categories: (1) miscible, (2) chemical and (3) thermal. Carbon dioxide injection falls into the first said group "miscible".

(b) Carbon Dioxide Flooding

Some of the characteristics of carbon dioxide that are effective in removing oil from porous rock are as follows:
(1) Swelling of the reservoir oil;
(2) Viscosity reduction of the reservoir oil; and
(3) Extraction and vaporization of lower mocular weight components of the reservoir oil.

Carbon dioxide is soluble in oil, and the solubility increases as pressure is increased. The dissolved carbon dioxide swells the oil and increases its volume. Solution of carbon dioxide also causes a large reduction in oil viscosity. These two characteristics result in an improvement of immiscible displacement of oil by carbon dioxide.

If the pressure is increased to the minimum miscibility pressure (mmp), the oil and liquid $Co_2$ become miscible in all proportions. Most laboratory research and field study of carbon dioxide flooding has been directed towards miscible displacement. Miscible displacement between oil and carbon dioxide results from hydrocarbon vaporization from the oil into the carbon dioxide. This occurs at the mmp, a relatively high pressure.

Although the pore to pore (microscopic) displacement efficiency of oil by $Co_2$ is very high in the area reached by $CO_2$, the overall displacement efficiency over a large block of porous material (a large volume of the oil formation or sand) is often hindered by mobility problems resulting in poor $Co_2$ sweep efficiency through the reservoir. These mobility problems are largely a result of the lower viscosity and density of the $Co_2$ phase as compared to the reservoir oil and brine or water phases.

Mobility of a fluid is a measure of its easiness of flow through porous media. It is intuitively understood that, if the displacing fluid is less viscous, and thereby can move more readily than oil, the displacement front will spread into the oil and early breakthrough(s) occur(s). Intrusion of the displacing fluid into the oil bank can also occur because of the density contrast. Both conditions, i.e. unfavorable viscosity and density ratios, exist in the case of $Co_2$ displacement.

(c) Status Of Sweep Efficiency Improvement

Previous studies that were aimed at improving the macroscopic displacement efficiency, or sweep efficiency of the $CO_2$ recovery process can be categorized in the following areas:

(1) The injection of alternating slugs of $CO_2$ and water is referred to as the "WAG" (water alternating gas) process. The purpose of the water injection is to decrease the $Co_2$ permeability relative to the oil permeability, thus and thereby retarding adverse movement of $Co_2$.

(2) The injection of an aqueous surfactant solution in conjunction with the $CO_2$ phase, which causes a foam to occur. The composite mixture has been found to have lower mobility than $Co_2$ by itself.

(3) With respect to the direct thickening of $Co_2$, attempts were made to find a polymer that was soluble in liquid or supercritical $CO_2$. It was thought that, if such a polymer could be found, the viscosity of the mixture would be higher than $CO_2$ by itself, thereby improving the sweep efficiency of the $CO_2$ phase. It has been attempted to achieve the same goal by searching for monomers that are soluble in $CO_2$ under conditions similar to reservoir conditions. An initiator would then be added to the mixture in an attempt to generate a polymerization reaction.

Despite this multiplicity of approaches, no workable scheme has yet been devised to substantially reduce the mobility of carbon dioxide, thereby to eliminate its early breakthrough. The subject improvement, as herein set forth, is aimed at filling up this gap. With the subject process, a breakthrough in $Co_2$ mobility control has emerged. Such success should have a major effect on prolonging the useful life of many oil fields.

The subject improvement and herein disclosed invention has resulted, when utilizing $CO_2$ as a neutralizing agent, in providing a simple and workable technique to reduce carbon dioxide mobility. It is realized that early breakthrough of $CO_2$ occurs because of its channeling through the oil zone. Plugging of these created channels should effectively substantially eliminate $CO_2$ production, per se, at production wells. Such plugging can be achieved by in situ polymer gellation initiated in such channels by the injection of $CO_2$. The subject newly discovered, bio-polymer is ideal for this purpose. Such polymer dissolves in alkaline solution, yet gels upon reduction of the pH of the solution below 7 (or substantial neutralization thereof). The reduction of pH can be achieved by flow of $CO_2$ through the solubilized, in situ, injected polymer solution and its solubility characteristic in the aqueous phase.

The polymer is produced by an aerobic type microorganism belonging to the Cellulomonas group of bacteria or others noted herein. The polymer itself has been determined to be a glucan-type polysaccharide. The polymer is completely soluble in 1N NaOH. When its solutions are neutralized or acidified to pH below 7.0 with mineral or organic acids or $CO_2$, a water insoluble gel is formed.

As laboratory investigations, the two processes below described illustrate the feasibility and actuality of the gelling of alkaline solubilized polymer in situ in oil sands by $CO_2$:

Part 1: ($CO_2$ Bubbles Rising Through A Polymer Solution). As mentioned earlier, the alkaline polymer solution is gelled upon neutralization or acidification. Therefore, it was expected that such gellation would occur in the presence of $CO_2$ and water. A cylindrical plexiglass tube of approximately one inch diameter and two foot length was filled with the aqueous polymer solution. Carbon dioxide gas was introduced from the bottom of the tube in the form of rising bubbles. The upper outlet of this tube was open to the atmosphere. The rise of the bubbles slowed down upon gellation of the solution. The viscosity of the gelled solution in the tube was measured using a Brookfield viscosometer before and after the $CO_2$ flow, thus confirming the gellation process.

Part 2: $CO_2$-Induced Gellation In A Berea Sandstone Core. An apparatus as shown in FIG. 4 of the drawings was designed and used in this part of the investigation. The main components are a pump, pressure transducers, a fraction collector and a Berea sandstone core.

The core was initially saturated with brine. The permeability of the core was determined knowing the pressure drop and brine flow rate. The brine was then displaced by oil to its connate water saturation, i.e. the saturation that cannot be reduced further by passage of more oil through the core. $CO_2$ injection was then initiated and the oil recovery thereby was measured. Injection of carbon dioxide continued until breakthrough of carbon dioxide occurred. Polymer solution injection was then initiated after the latter stage and any additional oil recovery was measured. Polymer solution injection was then stopped at polymer breakthrough and $CO_2$ injection was resumed.

In situ gellation of the polymer was induced by the latter $Co2$ injection. A change in the pressure gradient along the core was observed. Using a series of pressure transducers, equally spaced along the core, as seen in the drawing FIG. 4, the pressure gradient along the front segments of the core was plotted versus time. Higher pressure gradients indicated successful gellation. Spread of the length of the gellation zone was evident from the spread of the zone of high pressure gradient. This observation, combined with increased oil production from the core indicated a successful process.

The just recited process was limited to $CO_2$ flood at atmospheric pressure. That is, the in situ gellation achieved was for the immiscible $CO_2$ displacement. Provision of a system capable of investigating $CO_2$ displacement above its miscibility pressure and offering the prospect of in situ gellation of the alkaline polymer solution introduced by $CO_2$ under reservoir conditions is in preparation.

The carbon dioxide processes set forth above are aimed at a crucial and most important aspect of an enhanced oil recovery process. Carbon dioxide flooding has already attracted a great deal of enthusiasm and seems to be very promising compared to the other EOR techniques. This is especially true of the deep reservoirs with access to $CO_2$ resources. The present process significantly enhances the competitive nature of the $CO_2$ flooding process.

References

Holm. L. W., "Carbon Dioxide Solvent Flooding for Increased Oil Recovery", Petroleum Trans., AIME, 216 (1959).

Holm. L. W. and Josendal, V. A., "Mechanisms of Oil Displacement by Carbon Dioxide," J. Pet. Tech. (Dec. 1974) 1427-38.

Rathmell, J. J., Stalkup, F. I., and Hassinger, R. C., "A Laboratory Investigation of Miscible Displacement By Carbon Dioxide," SPE 3483 presented at the 46th Annual Fall Meeting of SPE-AIME, New Orleans, La., Oct. 3-6, 1971.

Caudle, B. H. and Dyes A. B., "Improving Miscible Displacement By Gas-Water Injection," Trans. AIME (1958) 213, 281-84; Miscible Displacement, Reprint Series, SPE, Dallas (1965) 8, 111-14.

Patton, JT., et al, "Enhanced Oil Recovery By $CO_2$ Foam Flooding," Second Annual Report, New Mexico State University, DOE/MC/03259-10, 1981.

Heller J. P., Lein, C. L. and Kuntamukkula, M. S., "Foam-Like Dispersions For Mobility Control In $CO_2$ Floods," SPE 11233 presented at the 59th Annual Fall Meeting, New Orleans, Sept. 1982.

Heller, J. P. and Taber, J. J., "Development Of Mobility Control Methods To Improve Oil Recovery By $CO_2$," Final Report, New Mexico Institute of Mining and Technology, DOE/MC/10689-17, 1983.

Heller, J. P., et al. "Direct Thickeners For Mobility Control Of $CO_2$ Floods," SPE 11789 presented at the International Symposium on Oil Field and Geothermal Chemistry, Denver, Colo., June 1-3, 1983, 173-182.

Terry R. E. et al., "Polymerization In Supercritical $CO_2$ To Improve CO2/Oil Mobility Ratios," Presented at the Enhanced Oil Recovery Symposium of the Am. Inst. of Chem. Engr. 1987 Spring National Meeting, Mar. 29-Apr. 2, 1987, Houston, Tex.

Buller, C. S. "Cellulomonas Flavigena Biopolymer", Patent Pending.

The Prior Art

As general background, applicants refer to Chapter 8 "*Economic Value Of Biopolymers And Their Use In Enhanced Oil Recovery*" A. Gabriel of Shell International Petroleum Company, Ltd., London, U.K. in "*Microbial Polysaccharides and Polysaccheroses*" Berkeley, R. C. W. et al, editors, Academic Press 1979. Also *Microbial Enhanced Oil Recovery-A Future, Yes Or No*?, V. Moses, School Of Biological Sciences, Queen Mary College (University of London), U.K. and *Biosurfactants In The Oil Industry,* David Gutnick, Tel Aviv University, Israel, the last two noted papers presented at Biotech 84 USA: Online Publications, Pinner, UK, 1984.

Also see from *The Polysaccharides* Volume 2, Academic Press, Inc. 1983, editor Aspinall, Gerald O. in Chapter 7 *Industry Utilization Of Polysaccharides,* Under Section 4 *Polysaccharides Of Commercial Importance,* Section D *Microbial Polysaccharides.* Also in this chapter and volume under Section III *Markets,* subsection B *Industrial Applications,* page 424, beginning at 438 are given "*Oil Field Applications*", including *Drilling Fluids, Cementing, Workover* and *Completion Fluids, Stimulation* and *Enhanced Oil Recovery.*

Applicant has obtained and reviewed copies of the following patents with respect to using one or another kind of materials (usually) after primary and secondary oil production methods (the latter typically water drive, polymer drive or the like) have been exhausted as to effectiveness.

Andresen U.S. Pat. No. 2,402,588 "Method Of Oil Recovery" issued June 25, 1946.

Fisher U.S. Pat. No. 2,816,610 issued Dec. 17, 1957 for "Minimizing Water Flow Into Oil Wells";

Brown U.S. Pat. No. 3,032,499 "Treatment Of Earth Formations", issued May 1, 1962.

Arendt U.S. Pat. No. 3,087,543, issued Apr. 30, 1963 for "Method For Improving Oil-Water Ratios Of Oil And Gas Wells".

Bernard U.S. Pat. No. 3,115,930, issued Dec. 31, 1963 "Process For Selectively Treating Subterranean Formations".

Boston U.S. Pat. No. 3,285,338 "Method For Oil Recovery" issued Nov. 15, 1966.

Sandiford U.S. Pat. No. 3,308,885, issued Mar. 14, 1967, for "Treatment Of Subsurface . . . Formations . . . ".

Williams U.S. Pat. No. 3,372,749, issued Mar. 12, 1968, for "Water Flood Processing Employing Thickened Water".

Eaton U.S. Pat. No. 3,396,790, issued Aug. 13, 1968, for "Selective Plugging Of . . . Subterranean Formations".

Pye U.S. Pat. No. 3,999,725, issued Sept. 3, 1968 for ". . . Improved Waterflooding Process".

Raifsnider et al U.S. Pat. NO. 3,404,734, issued Oct. 8, 1968 "Method Of Plugging Formations . . . ".

Bernard U.S. Pat. No. 3,530,937, issued Sept. 29, 1970 for "Method For Waterflooding . . . Petroleum Reservoirs".

McAuliffe U.S. Pat. No. 3,472,319 "Methods Of Improving Fluid Flow In Porous Media", issued Oct. 14, 1969.

Hurd U.S. Pat. No. 3,581,824, issued June 1, 1971 for "Oil Recovery Process Using . . . Polysaccharide Thickening Agent".

Lanning et al U.S. Pat. No. 3,658,129, issued Apr. 25, 1972 for "In Situ Gelation Of Polymers . . . ".

Presley, et al U.S. Pat. No. 3,684,011 issued Aug. 15, 1972 for "Mobility Control By Partial Plugging Of Formations".

Routson U.S. Pat. No. 3,687,200, issued Aug. 29, 1972 for "Method For Controlling Flow . . . In Subterranean Formations".

Hesser et al U.S. Pat. No. 3,749,172, issued July 31, 1973 for "Methods Of Using Gelled Polymers In . . . Wells".

Gall "Subterranean Formation Permeability Correction", U.S. Pat. No. 3,762,476, issued Oct. 2, 1973.

Clampitt U.S. Pat. No. 3,785,437, issued Jan. 15, 1974 for "Method For Controlling Formation Permeability".

Moote et al "Subsurface Formation Treatment" U.S. Pat. No. 3,841,405 issued Oct. 15, 1974.

Bernard U.S. Pat. No. 3,882,938, issued May 13, 1975 for "Process For Recovering Oil . . . ".

Sandiford U.S. Pat. No. 4,069,869, issued Jan. 24, 1978 for "Plugging High Permeability Zones Of Reservoirs . . . ".

Clampitt et al U.S. Pat. Reissue No. 29,716, reissued Aug. 1, 1978 "Method Of Drilling A Borehole Using Gel Polymers".

Colegrove "Water-Diverting Gel Composition" U.S. Pat. No. 4,157,322, issued June 5, 1979.

Shu U.S. Pat. No. 4,606,407, issued Aug. 19, 1986 "Programmed Gelation Of Polymers For Oil Recovery Permeability Control".

Paul et al U.S. Pat. No. 4,658,898, issued Apr. 21, 1987 for "Oil Reservoir . . . Control Using Polymeric Gels".

Also note citations of relevant background literature in other portions of this specification.

ENVIRONMENT OF THE INVENTION

Figure 1:
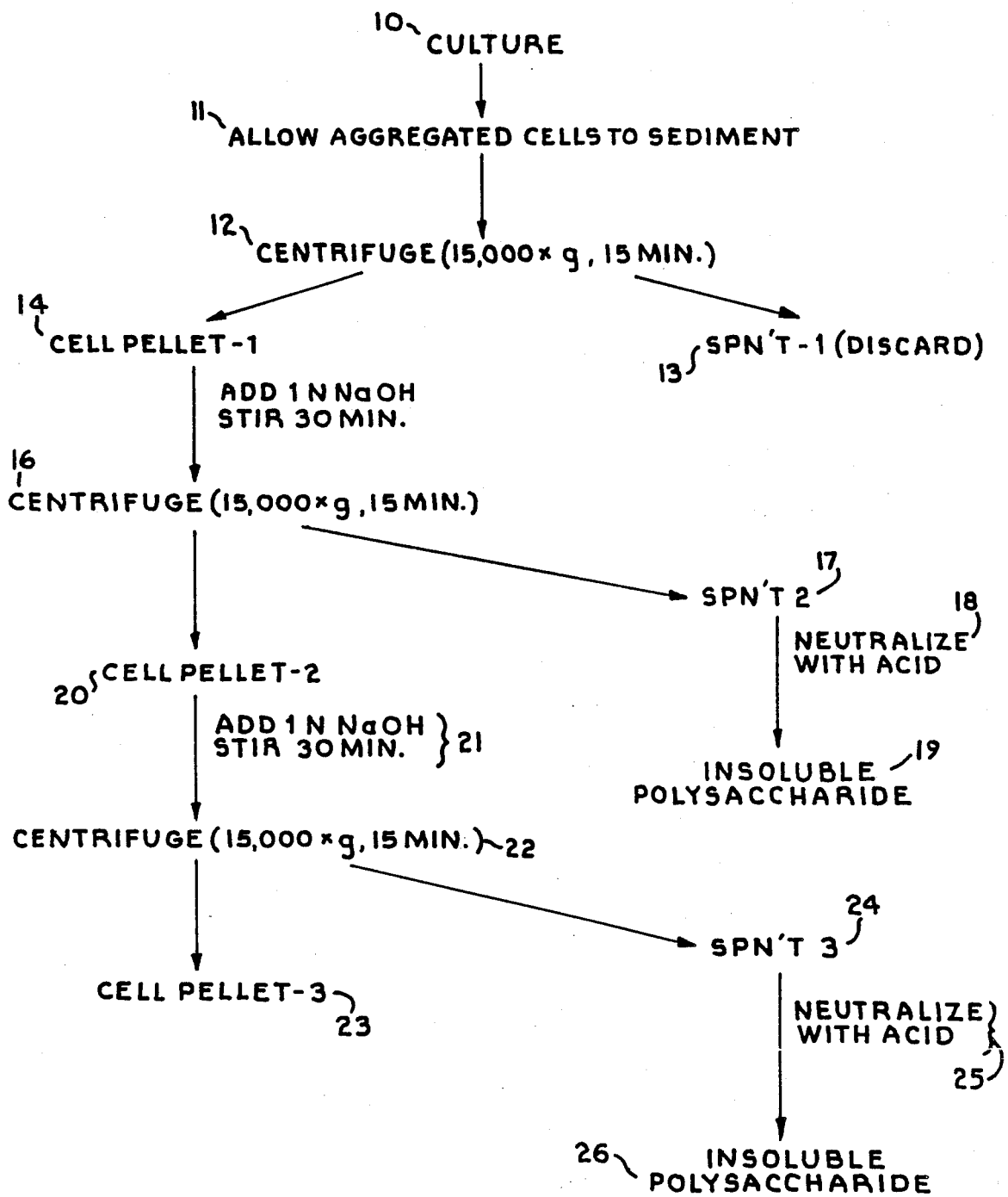
FIG. 1 is a schematic procedural delineation of the successive steps in the extraction and purification of exopolysaccharides useable in this invention.

It seems to be the fact that the precise, between wells physical configurations, compositions and permeabilities, as well as oil, gas and water content of the various three dimensional zones of oil sands and formations are very difficult to precisely and exhaustively determine. One may visualize a single injection well having a spaced-away-therefrom single production well, or the single injection well surrounded by a plurality of spaced away production wells (a specific, but not limiting example of the latter being like the five (5) face of a die (dice)). Still further, after the primary production procedures have depleted the natural, inherent pressurization in the oil sand, as well as exhausted the utility of pumping fluids from the well bores in the oil sand, certain changes undoubtedly have taken place in the oil formation, horizon or sand surrounding a production well (as compared to the sand/formation state before any production therefrom).

Thereafter, we typically have secondary production which commonly may involve injection of fluids (liquids and/or gases) into the formation or oil sand from (to pick any one particular zone) a new injection well (perhaps new only in use as an injector) to sweep or drive liquid(s) into the surrounding and outlying oil sand from the injection well, whereby to produce additional residual oil at one or more outlying, surrounding production wells. This secondary production process again changes the character of the oil sand, this time circumferential to the injection well(s), particularly in (a) scavenging oil out of some relatively more permeable zones, (b) filling such more permeable zones with water flood or drive water and (c) leaving, in less permeable zones of the sand, large quantities of unproduced oil.

Once the liquid received in the production well(s) from the water drive is of an objectionably high percentage of water to oil, then ordinary secondary production is presumed to be played out. Pure water or water plus dissolved polymer or water plus "X" material or materials, liquid or liquids, can have been used in the initial secondary oil production sweep in the formation or, alternatively, sequentially thereto, a stepped process such as first with water alone and then water plus polymer. $CO_2$ injection, as noted above, is an actively used present time oil recovery technique.

As noted, the state of the oil sand surrounding any given injecting or injection well(s), after carrying out of partially effective secondary production therewithin by a process such as water drive, thus is again drastically changed. The volumes, configurations and positions of the sand zones scavenged largely of oil (necessarily the zones of higher permeability) are interlaced and interwoven in perhaps very geometrically complex, simple (or both) manners (or even in literally undescribeable, very tortuous and extremely variable fashions). The status of any given strata or zone of the formation may be determined at any particular point near, surrounding or far from the injection well(s) by newly drilling into the formation and examining oil cores taken therefrom. However, such cores may well be totally unrepresentative of the status of the significant permeable/less permeable formations, water logged zones, oil holding zones and the like. Such may differ vertically in the formation, concentrically with respect to one or more of the injection well(s) and radially out from such injection well(s).

PURIFICATION AND CHARACTERIZATION OF A GELABLE EXTRACELLULAR POLYGLUCAN PRODUCED BY BACTERIA

INTRODUCTION

Many microorganisms are capable of synthesizing polysaccharides and do so for a variety of reasons. In some instances the polysaccharides accumulate intracellularly and are utilized as energy reserves. In other instances they are excreted as spill over products and accumulate as capsules or as loosely associated slimes. Bacteria growing in their natural habitat, or pathogens while growing in tissues, may form an extracellular structure, designated as a glycocalyx [3,4], which often is comprised of polysaccharides. The glycocalyx is thought to have a role as an adhesion, thereby allowing the bacterium to adhere to solid surfaces. The synthesis of exopolysaccharides is costly in terms of ATP, and for that reason the glycocalyx frequently is lost when the organisms are cultivated under conditions in which it no longer is needed, e.g. under lab culture conditions.

*Cellulomonas flavigena* (819) strain KU produces an exocellular polysaccharide which apparently enables the bacteria to adhere to each other, resulting in their aggregation. The polysaccharide is not lost upon extensive subculture, differing at the least in that respect from a glycocalyx. Although the polysaccharide accumulates extracellularly it nevertheless is used as an energy reserve. Energy reserves most commonly accumulate as intracellular deposits or granules.

The specific bacterium noted was originally isolated from leaf litter and has been characterized as *Cellulomonas flavigena* strain KU (ATCC 53703). Several other species of Cellulomonas which are able to produce a polymer identical to that produced by *Cellulomonas flavigena* strain KU can also be used. These include *Cellulomonas flavigena* (ATCC 482), considered to be the type species, *Cellumonas uda* (ATCC 491) and *Cellulomonas spp.* (ATCC 21399).

The purpose of this presentation is to describe the conditions leading to the synthesis of an exopolysaccharide by *Cellulomonas flavigena*, its role as an energy reserve, its extraction and purification, and its chemical and physical properties.

Results and Discussion

Description Of The Bacterium

The bacterium used in these experiments was originally isolated from leaf litter and has been characterized as *Cellulomonas flavigena* strain KU. It differs from American Type Culture Collection (ATCC) #482, the strain which is considered to be the type species of *Cellulomonas flavigena*, in its morphology and the amount of extracellular polysaccharide produced (Angelo et al., accepted for publication by J. Ind. Microbiol.).

Growth Conditions Leading To Aggregation

*Cellulomonas flavigena* can be grown in simple salts media that contain carbohydrates as the carbon and energy source and ammonium salts as the nitrogen source. After growth in such media the bacteria are densely aggregated and when the cultures are allowed to stand the bacteria rapidly settle out of suspension. Electron microscopic examination of cross sections of such cells reveals that they are surrounded by a large capsule. The bacteria contained large amounts of the polymer only when they are aggregated and encapsulated. Growth of *C. flavigena* in complex media, such as tryptone broth or nutrient broth, does not result in aggregation of the cells and they are not encapsulated.

Table 1 is a comparison of the carbohydrate content of the cells after growth either in simple salts media with a variety of carbohydrate energy sources, or in tryptone broth. The total reducing sugar content of hydrolyzates of such cells was measured by the phenol sulfuric acid assay (8) and the glucose content by the glucose oxidase assay. Aggregation and encapsulation of the cells occurred only after growth in simple salts media with excess carbohydrate, and the dry weight yield of cells in such cultures was as much as 13 times of that from tryptone broth cultures. Most of that difference can be accounted for by the very high sugar content of the aggregated bacterial cells.

Table 2 indicates that when aggregated cells are incubated in a starvation medium, i.e. a medium without a carbon source, they will utilize the capsule as an energy reserve. Both phase contrast microscopy and electron microscopy were used to monitor the disappearance of capsules and the concomitant disaggregation of the cells.

The high glucose content of hydrolyzates of aggregated cells (Table 1) suggests that capsular energy reserve is, at least in part, a polysaccharide. FIG. 1 outlines the steps in a procedure that was used to extract polysaccharide from aggregated *C. flavigena* strain KU. This procedure takes advantage of the fact that *C. flavigena* cells that have formed capsules and have become aggregated will rapidly settle out from the growth media when agitation of the culture is terminated. After standing briefly, the cell free upper phase, usually consisting of about 75% of the culture volume, can be removed by aspiration. The remaining cells are then collected by centrifugation and, after being washed with water, are resuspended in 1.0 N NaOH, at a concentration of 1 gm of cells (wet weight)/4 ml of 1.0 N NaOH. Two extractions are sufficient for the removal of at least 95% of the polysaccharide. When the supernatants of the first and second extractions are neutralized with either 50% (w/v) acetic acid or 6 N HCl, the polysaccharide separates out of solution and, in the process, the entire volume of the supernatants congeals. Purification of such hydrogels is readily accomplished by resuspending them in 10 to 20 volumes of water and, after stirring, allowing the water insoluble polysaccharide to settle out. The clear upper phase may then be removed by aspiration. This process may be repeated until the preparation is free of inorganic phosphate (1) and protein (9).

Characterization of an Alkali Soluble Polymer Extracted From Aggregated Cells The chemical composition and solubility characteristics of the polysaccharide extracted from aggregated *C. flavigena* cells and some properties of the hydrogel formed by it are listed in Table 3. Its composition as a glucose homopolymer was indicated by thin layer chromatography (TLC) and gas liquid chromatography (GLC) of hydrolyzates of purified polysaccharide. Thin layer chromatography of such hydrolyzates revealed one spot which had an Rf identical to that of authentic glucose. A GLC analysis of trimethylsilyl (TMS) derivatives of the hydrolyzate likewise indicated that the polymer is comprised of glucose only. Furthermore, a determination of the total reducing sugar content of hydrolyzates of the polymer, by use of the phenol-sulfuric acid method (8), indicated that the entire weight of a sample of highly purified polysaccharide could be accounted for as reducing sugar if glucose was used as the reference sugar.

The solubility characteristics of the polymer and its ability to form hydrogels are similar to those of curdlans (6,7). Nakanishi et al. (10), however, tested a large number of organisms, including *Cellulomonas flavigena*, for the ability to produce curdlan, and found that only certain strains of *Alkaligenes faecalis* and of Agrobacterium were able to do so.

Figure 2:
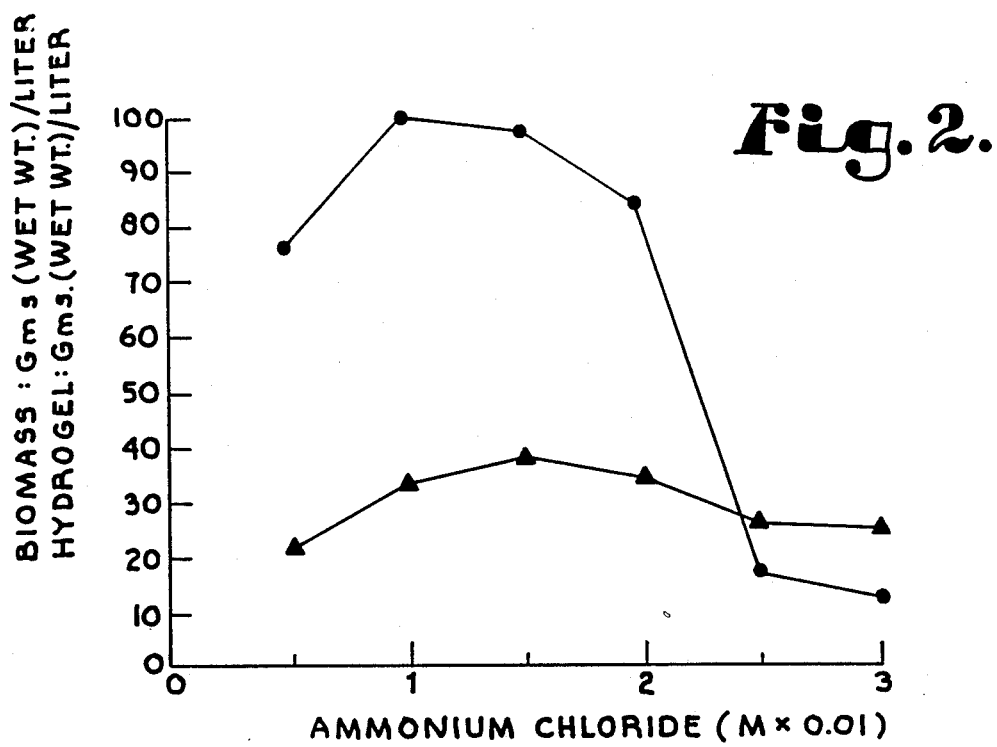
FIG. 2 is a graph showing the effect of nitrogen concentration on biomass and hydrogel production. Bacteria were grown in flask cultures in CM9 medium containing the indicated amounts of ammonium chloride and 4% glucose. Cultures were incubated with shaking (250 rpm) at 30° C. for 72 hours. The triangular symbols show biomass, the circular symbols hydrogel.

Effect of Nitrogen Concentration Of Growth Media On Biomass And Polysaccharide Production Exopolysaccharide synthesis often is enhanced by the growth of bacteria in media containing limiting amounts of nitrogen and an excess of the carbon and energy source (5, 12, 13, 14). The relationship of the nitrogen concentration of the growth medium to the growth of *C. flavigena* strain KU and the amount of polysaccharide synthesized is shown in FIG. 2. *Cellulomonas flavigena* strain KU was grown for 72 hours in flasks containing media with the indicated NH$_4$Cl concentrations. Samples were removed for the estimation of bacterial growth and of the amount of extractable polysaccharide. Growth was estimated on the basis of the wet weight of biomass/ml of culture and estimates of polysaccharide production were based upon the amount of hydrogel which could be obtained from alkaline extracts of the bacteria. To standardize the determination of the wet weights the samples were always centrifuged for 15 min at 15,000×g. FIG. 2 shows that an increase in the concentration of NH$_4$Cl, from 0.005 M to 0.015 M, was accompanied by an increase in biomass. Polysaccharide synthesis also increased, but the maximum yield was observed in the medium with 0.01 M NH$_4$Cl. Table 4 indicates that the decrease in biomass and hydrogel at higher concentrations of NH$_4$Cl was accompanied by a decrease in pH of the media. Cellulomonas species are facultatively anaerobic and may produce considerable amounts of acid from glucose (2,11).

Figure 3:
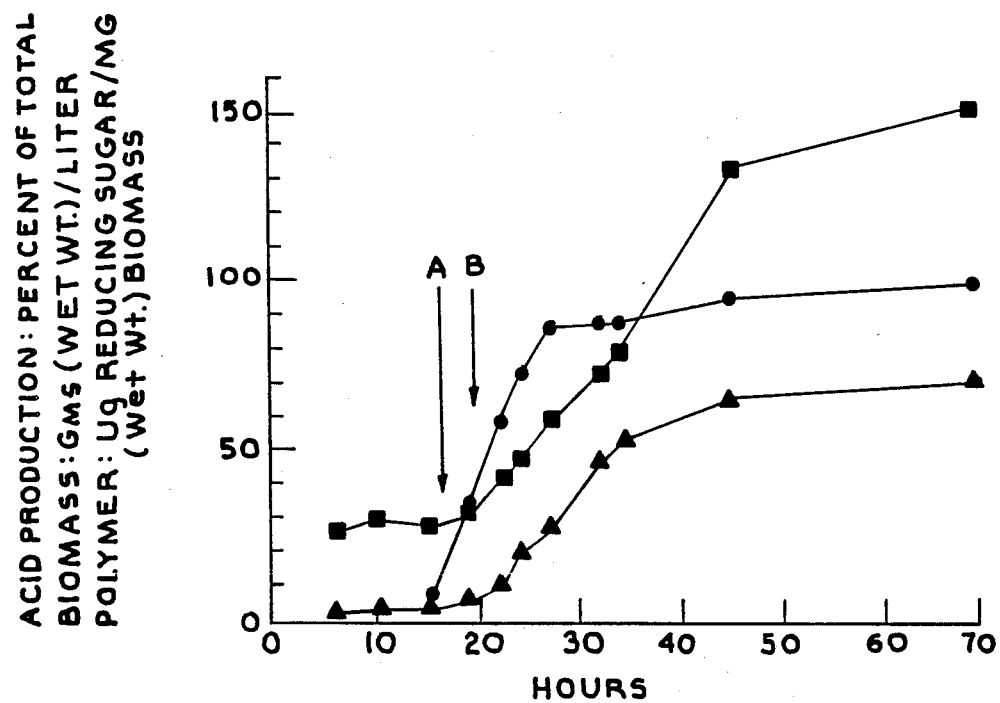
FIG. 3 shows the time course of growth and polysaccharide production. Bacteria were grown at 30° C., with rapid aeration, in a Biostat table top fermentor (with pH maintained at 6.7). CM9 Culture Medium contains 0.02M $NH_4CL$ and 2% glucose. Symbols: circular dots, acid; triangles, biomass; squares, polymers; A aggregation first observed by phase contrast microscopy; B macroscopic aggregation.

The decrease in the polysaccharide/biomass ratio which was observed in cells grown in media with increasing NH$_4$Cl concentration (Table 4) presumably was a consequence of the low final pH of the culture media. Accordingly, growth of the bacteria in a 1 liter table top fermentor which provided automatic pH control was examined. FIG. 3 shows the results from a culture in which the starting NH$_4$Cl concentration was 0.02 M and the pH was maintained at 6.7. At the indicated times samples were withdrawn for the determinations of biomass and the amounts of reducing sugar in alkaline extracts of them. The examination of the samples by phase contrast microscopy indicated that the cells had begun to aggregate at 22 h and by 24 h the extent of aggregation was such that the cells rapidly settled out of suspension. The final yield of biomass was 71.1 mg/ml (wet weight), in contrast to the yield of 34 mg/ml obtained in shake cultures which also were 0.02 M with respect to NH$_4$Cl but which lacked pH control (FIG. 2). The dry weight yield of biomass, determined only on the final sample from the pH controlled culture, was 14.9 mg/ml.

Thus, as has been reported for other bacteria (5, 12, 13, 14) the synthesis of polysaccharide by *C. flavigena* is enhanced by low concentrations of inorganic nitrogen. With *C. flavigena*, however, the inhibitory effect of increasing the nitrogen is a consequence of a drastic decrease in pH, occurring presumably as a consequence of increased cell metabolism. This may also explain why the production of an extracellular polysaccharide by *Cellulomonas flavigena* has not been previously reported. It may have been unnoticed because the bacteria do not produce it when they are grown in standard minimal salts media, such as M9, containing the usual 0.018–0.02 M NH$_4$Cl, unless the glucose concentration is at least 1% (w/v). At higher concentrations of glucose the culture becomes so acidic that growth and polymer production are decreased.

TABLE 1

Carbon and energy sources tested for ability to support polysaccharide synthesis.

| Growth Substrate | Aggregation, Encapsulation | Yield (mg dry cells/ml culture) | Sugar Content (% of dry weight) Phenol sulfuric | Sugar Content (% of dry weight) Glucose Oxidase |
|---|---|---|---|---|
| 1% Glucose | + | 6.81 | 94.1 | 87.2 |
| 1% Xylose | + | 6.44 | 93.9 | 82.3 |
| 1% Glycerol | + | 6.34 | 93.5 | 85.1 |
| 1% Maltrin 200* | + | 6.12 | 90.0 | 85.2 |
| 1% Tryptone | − | 0.53 | 12.6 | — |

Growth media: minimal salts containing indicated carbon and energy source and 0.005 M NH$_4$Cl.
*Maltrin 200 is classified as a corn syrup solid or maltodextrin. It is a product from Grain Processing Corporation, Muscatine, Iowa.
Cultures were incubated at 30° C. for 72 h, with shaking (25 rpm).

TABLE 2

Role of capsules as energy reserve.

| Hours in starvation medium | capsules | Reducing sugar content ug/mg of dry cells | Reducing sugar content % of original | Dry weight of bacteria mg/ml culture | Dry weight of bacteria % of original |
|---|---|---|---|---|---|
| 0 | + | 581.5 | 100.0 | 1.41 | 100.0 |
| 18 | +,− | 131.1 | 22.5 | 1.19 | 84.4 |
| 40 | − | 139.9 | 24.1 | 1.14 | 80.1 |

Cells were grown in a minimal medium containing 0.75% glucose and incubated at 30° C. with shaking at 250 rpm until maximum aggregation was achieved. The aggregated cells were harvested by centrifugation (15,000 × g, 20 min.) and washed with sterile saline. The cells were then transferred to fresh medium which contained an excess of nitrogen (0.018 M NH$_4$Cl) but lacked a carbon and energy source, and the cultures were incubated as described above. Reducing sugar content of hydrolyzates was determined by phenol sulfuric acid method (8).

TABLE 3

Characteristics of the polyglucan

A. Chemical composition
  1. Glucose homopolymer in which glucose subunits are joined via B-1,3-glucosidic bonds.

2. Infrared (IR)—and nuclear magnetic resonance (NMR) spectra similar but not identical to B-1,3-glucans known as curdlans.

B. Solubility characteristics
1. Soluble in 0.1 N (or greater) sodium- and/or potassium-hydroxide.
2. Soluble in 85% (or more concentrated) formic acid.
3. Soluble in dimethyl sulfoxide (DMSO).
4. Poorly soluble in ammonium hydroxide.
5. Insoluble in water, methanol, ethanol, isopropanol, and acetone.

C. Properties of the hydrogel
1. Resuspension of the polymer at a concentration of 2 mg/ml of water leads to formation of a hydrogel. After centrifugation at 15,000×g for 15 min 97% of the weight of the hydrogel is accounted for by the entrained water.
2. Heating the hydrogel does not result in solubilization of the polymer.

TABLE 4

Effect of nitrogen concentration on polysaccharide production

| Ammonium chloride concentration (M) | Final pH of culture | Polysaccharide/ total biomass |
|---|---|---|
| 0.005 | 6.80 | 3.45 |
| 0.010 | 6.64 | 2.98 |
| 0.015 | 6.34 | 2.54 |
| 0.020 | 5.62 | 2.45 |
| 0.025 | 4.90 | 0.63 |
| 0.030 | 4.76 | 0.45 |

Growth medium contained 4% glucose. Cultures were incubated for 72 h at 30° C. with shaking at 250 rpm. Ratio based upon wet weight of polysaccharide and biomass, determined after centrifugation for 15 min at 15,000×g.

The modification of the permeability of subterranean formations can be accomplished either by the use of alkaline suspensions of incapsulated bacteria or by the use of crude extracts of the polymer. Alkaline suspensions can be prepared by simply resuspending the bacteria in 1N NaOH. This step takes advantage of the fact that *C. flavigena* cells that have formed capsules and have become aggregated will rapidly settle out from the growth media when agitation of the culture is terminated. The resuspension of the cells in alkali results in the extraction and solubilization of the polymer while leaving the bacterial residue in suspension. If partially purified polymer is desired, then the bacteria can be mechanically removed (e.g. by centrifugation) from such suspensions, as shown in drawing FIG. 1. Neutralization of the alkaline extract which contains cells and/or the cell free extracts results in gelation of the polymer.

The principal reason for removing the bacterial debris from alkaline suspensions would be to obviate the possibility of an unwanted "plugging" of subterranean strata and/or oil sands. However, in a recent symposium report (F. Cusack, et al *Formation Of Ultra Bacteria To Enhance Oil Recovery By Selective Plugging*, IGT Symposium In Gas, Oil And Coal Biotechnology, December, 1988; New Orleans, La.), it was shown that starvation of bacteria resulted in decreasing the size of bacterial cells and that such cells flowed into and through high permeability zones in earth formations and oil sands, without any unwanted permeability reduction.

Plugging occurred only when nutrients were introduced, resulting as a consequence of the growth associated increase in size of the bacterial cells. Electron microscopy has been used to demonstrate that, although alkali extracted cells remain structurally intact, they are very prominently reduced in size. Because of their small size, the suspended bacteria also will be able to flow into zones of high permeability, but because they have been killed by the alkali, they will not be able to grow and cause undesired plugging. Plugging would occur only upon gellation of the polymer dissolved in the sodium hydroxide solution NaOH which also happens to contain the resuspended cells.

Bacteria Of Genera Other Than Cellulomonas

Certain other polysaccharides, belonging to a family of polymers known as the curdlans, also can be used for permeability modifications in processes identical to those described for the exopolysaccharide product of Cellulomonas. The chemical compositions of the polyglucan produced by the various Cellulomonas species and that of the curdlans are similar, if not identical. All are polyglucan homopolymers in which the glucose subunits are joined via B-1, 3-glucoside bonds. They may differ in degree of polymerization and possibly in the occurrence of a small amount of branching. Because of their solubility in NaOH and their ability to form gels upon neutralization of the alkali, they all are suitable for the in situ permeability modifications of subterranean strata described hereinbefore and hereinafter. The noted curdlans are produced by *Alkaligenes faecalis subsp. myxogenes* (ATCC 21680, *Alkaligenes faecalis* (ATCC 31749) and *Agrobacterium radiobacter* (ATCC 21679).

Looking at FIG. 1 of the drawings, it should be noted that level 2 (allow aggregated cells to sediment) after the supernatant is poured off produces a condition of the bacteria and capsules which may be fed into an earth strata, oil sand or oil formation, per se. At level 4, "cell pellet-1", this status of the process may be employed as an input to oil sands or oil formations after the supernatant 1 is discarded therefrom.

References Cited

Ames, B. N., "Assay Of Inorganic Phosphate, Total Phosphate, And Phosphatases," In: *Methods in Enzymology VIII.* (Neufeld, E. F. and Ginsburg, V., eds.), 115–118, Academic Press, N.Y. 1966.

Chosson, J., "Inhibition Of Cellulolytic Activity By Lactate In *Cellulomnas uda* Species," *Biotechnol. Bioeng.* 9, 767–769 (1987).

Costerton, J. W., Irvin, R. T. and Cheng, K.-J., "The Bacterial Glycocalyx In Nature And Disease." *Ann. Rev. Microbiol.* 35, 299–324 (1981).

Costerton, J. W. Marrie, T. J. and Cheng, K.-J., "Phenomena Of Bacterial Adhesion," In: *Bacterial Adhesion* (Savage, D. C. and Fletcher, M., eds.), 3–43, Plenum Press, New York, 1985.

Duguid, J. P. and Wilkinson, J. F., "The Influence Of Cultural Conditions On Polysaccharide Production By *Aerobacter aerogenes.*" *J. Gen. Microbiol.* 9, 1974–189 (1953).

Harada, T., Masada, J., Fujimori, K. and Maeda, I., "Production Of A Firm, Resilient Gel-Forming Polysaccharide By A Mutant Of *Alkaligenes faecalis* var. *myxogenes* 10C3." *Agr. Biol. Chem.* 30, 196–198 (1966).

Harada, T., Misaki, A. and Saito, H., "Curdlan: A Bacterial Gel-Forming B-1,3-glucan," *Arch. Biochem. Biophys.* 124, 292–298 (1968).

Hodge, J. E. and Hofreiter, B. T., "Phenol-Sulfuric Acid Colorimetric Method," In: *Methods in Carbohydrate Chemistry, Vol. I* (Whistler, R. L. and Wolfrom, M. L., (eds.), 388–389, Academic Press, New York, 1962.

Lowry, O. H., Rosebrough, N. J., Farr, A. L. and Randall, R. J., "Protein Measurement With The Folin Pehnol Reagent," *J. Biol. Chem.* 193, 265–275 (1951).

Nakanishi, I., Kimura, K., Suzuki, T., Ishikawa, M., Banno, I., Sakane, T. and Harada T., "Demonstration Of Curdlan Type Polysaccharide And Some Other B-1,3-Glucan In Microorganisms With Aniline Blue," *J. Gen. Appl. Microbiol.* 22, 1–11 (1976).

Stackebrandt, E. and Keddie, R. M., "Cellulomonas", In: *Bergey's Manual Of Systematic Bacteriology*, Vol. 2 (Sneath, P. H. A., Mair, N. S., Sharpe, M. E. and Holt, J. G., eds.), 1325–1329, Williams and Wilkins, Baltimore, Md., 1986.

Sutherland, I. W., 1979. "Microbial Exopolysaccharides: Control Of Synthesis And Acylation," In: *Microbial Polysaccharides and Polysaccharases* (Berkeley, R. C. W., Gooday, G. W. and Elwood, D. C., eds.), 1–34. Acad. Press, New York, 1979.

Wilkinson, J. F., Duguid, J. P. and Edmunds, P. N., "The Distribution Of Polysaccharide Production In Aerobacter and Escherichia strains and its relation to antigenic character," *J. Gen. Microbiol.* 11, 59–72 (1954).

Williams, A. G. and Wimpenny, J. W. T., "Exopolysaccharide Production By Psedomonas NCIB 11264 Grown In Batch Culture," *J. Gen. Microbiol.* 102, 13–21 (1977).

Petroleum Production Aid

With respect to the description of the applications of the new process and methods disclosed herewith, it is assumed for the discussion of the following that there is an oil sand or formation of a given thickness into which at least one injection well has been bored or prepared from an old production well. Primary production (both by natural pressurization and pumping) has ended in the oil sand and formation with respect to one or more production wells spaced away from and around the injection well, as well as at the injection well itself. The injection well may have been, initially, a production well through which primary production was completed. Thereafter, for at least the said injection well, the wellbore is prepared for input of fluid injection media by any of the well known, standard, conventional and adequate means.

As a typical example, a casing may be run from the surface into and typically through the oil sand in the originally drilled wellbore. This casing may then be perforated by conventional means through the casing and surrounding cement across any selected vertical portion of the wellbore and cemented casing in the oil sand or the entire face thereof. Then, typically, but not limiting, an injection pipe is run in the wellbore into or through the oil sand, then an injection zone is packed off, above and below the zone which is to be fluid or water injected or yet the entire sand (so that the injection pipe perforated zone is exposed only to the casing perforated zone which is desired to be injected or pressurized). The face of the wellbore in or at one or more levels of the height of the sand, in addition to having been perforated, may also have been fractured by conventional means and methods.

Thereafter, in any conventional manner, such as, as noted, packing off the perforated sand face or any portion thereof, water flood or water drive or other conventional secondary production method may be undertaken from at least the said injection well to the production well or wells positioned away from but around the injection well. Eventually all of the production wells will be reached by injected fluids, unless thief zones, high permeability zones, etc. delay or screen one or more of the production wells from water drive or other system oil production in secondary recovery.

The advantages and limitations of secondary production are set forth in very considerable detail herein, hereinabove and in the patent references, as well as literature references, set forth hereabove. The basic situation is that, in the process of water (or other fluid) drive in secondary oil production, only a certain amount of the oil is driven through the formation to one or more of the production wells. The water or other fluid injected into the injection well usually essentially spreads out circumferentially therefrom, viewed from above, optimally in a concentric increasing circle manner, but actually in differing profiles as the water flood or other injection encounters low permeability zones, thief zones and the like. Eventually one or more of the production wells produces so much water with any oil produced from the well that it is not economical to continue the water drive. As each production well reaches a selected water/oil production ratio such well may be closed down from production. This outward fluid migration leaves the circumferential zone around the injection well, to the distance to which the water (or other) drive has penetrated in any direction through the formation and with respect to the vertical cross section of the formation, with a lot of water (or other fluid) in thief zones, high permeability zones and zones from which oil has been driven and, typically, with an even greater amount of oil being retained in the sand by-passed by the flow of the water (and/or other fluid) fronts circumferentially outwardly through the sand compared to what oil has been produced.

Depending on just what is intended to be accomplished in the previously water and/or other fluid flooded oil formation, with respect to any given injection well, its wellbore and surrounding sand zones, the following steps take place, in the subject process and variations thereof.

First, a quantity of either acidic water or reversibly gelable, alkaline polymer solution (which solution gels upon neutralization and acidification thereof) is injected from the injection well into the above formation. There is a difference in treatment of the sand available between either first injecting the acidic water or first injecting the polymer solution. That is, the acidic water injection has substantially the same effect as injecting water or brine, per se. Thus, it (presumably and/or largely) merely drives itself into the permeable zones and thief zones following the initial water drive pattern set up therein, probably producing no better results with respect to oil/water ratios in production from the reopened production well or wells. Accordingly, a predetermined quantity of acidic water is injected into the oil sand at the injection well in the quantity needed for the process to follow. Thus, if it is desired to merely treat a portion of the oil sand relatively close to the injection well, a limited quantity is injected. This quantity can be increased to the extent desired by the operator attempting to penetrate with the acidic water the original water zones one-fourth, one-half, three-fourths, etc. of the distance between the injection well and one or more of the production wells. Alternatively, this injection can be continued until acidic water is produced in one or more of the production wells. $CO_2$ is not used in the subject process as a first injected precipitating fluid or substance.

On the other hand, if the reversibly gelable alkaline polymer solution is first injected into the oil formation or oil sand, considerably different results may be achieved therefrom. That is, because of the greater viscosity of this polymer solution, it may cause the production of oil and water in one or more of the reopened production wells at a higher oil/water ratio than was produced by the water (or other fluid) drive from the beginning at some point in the injection of the polymer solution Accordingly, again, the injection into the injection well of the quantity of reversibly gelable, alkaline polymer solution (which solution will gel upon one of neutralization and acidification thereof) may be continued for only a short time, planning on effecting only a relatively near portion of the sand surrounding the injection well, any greater quantity and time interval thereof or until the polymer solution is produced from one or more of the production wells. Thus it is a first advantage of the subject, reversibly gelable alkaline polymer solution here disclosed that it will or may make more effective and efficient the original water (or other fluid) drive as the polymer solution is injected further and further into the formation. Presumably, what happens is that the polymer solution tends to follow the paths of least resistance caused by the original water or brine drive but also penetrates therefrom or directly into zones reachable by the more viscous, thickened liquid being injected, which zones resisted the water or brine drive therebefore.

The next stage is to preferably clear the inside wellbore injecting zone of either (1) the acidic water or (2) the polymer solution, at the very least into the face of the formation. Alternatively, this clearing of the acidic water or polymer solution can be effected for a lesser or greater circumferential distance out into the sand from the injection well. This is to insure that the gelling of the polymer upon interaction of the acidic water (or $CO_2$ when polymer is first injected) and polymer solution will not block or prevent large area injection of the acidic water (or $CO_2$ when polymer is first injected) or polymer solution (depending on which had been injected first).

If, inadvertently, the injection equipment and piping, the annular wellbore in the injection zone and/or the face of the injection zone casing and/or formations are inadvertently plugged by gelled polymer, injection of NaOH solution will clear such impedances.

SPECIFIC APPLICATIONS AND PROCESSES

With respect to conventional methods of enhanced recovery of oil by the injection of a flooding fluid into a subterranean oil-bearing formation through an injection well extending from the surface of the earth into the formation, whereby to displace in situ oil from the formation towards at least one production well spaced at a distance away from the injection well, the following is noted.

The instant process can be employed with respect to an oil-bearing formation where the inherent pressure within the oil sand (operative to move oil and/or water and/or other formation fluids into drilled wellbores extending into the sand) and involving the inherent process of pressure drive in the formation has been exhausted. Yet further, the use of the process may also be initiated when the stratagem of pumping from one or more such oil well wellbores conventional liquid oil which will, over time, move gradually into such wellbores has proved economically impractical.

Thus, the herein described processes may be employed before secondary oil production is used in formation. However, most typically, the said depleted oil formation (of gas pressure, formation liquids and the like) has been subjected to any one or more of a conventional secondary recovery process, most particularly considering a water or other fluid drive(s) or a drive of the nature set forth in the prior art literature patents any one of before, with or after utilizing the said secondary recovery process. What this means is that only a portion of the commercially useful liquids in the oil formation (primarily petroleum oil) have been scavenged from the pressure depleted formation as, as is well known in secondary recovery drives, high permeability zones tend to accept the water (or other fluid) of the drive and low permeability zones are not cleared out or scavenged in conventional secondary oil production.

Acid Injection First

A first improved process of the subject methods here disclosed comprises first injecting a selected quantity of acidic (mineral or organic acid) water into the said formation through a well thereinto selected as an injection well. Presumably, there are one or a number of surrounding wells to the said injection well which will serve as production wells. After the said quantity of acidic water has been injected into said formation, most preferably, there is next injected a sufficient quantity of one of water or brine into said formation (after the acidic water injection) whereby to clear (1) the injection equipment, (2) the fluids in the injection portion of the wellbore and (3) the wellbore face to any predetermined depth, of the acidic water injection. The point of this is to avoid immediately clotting and clogging in or at: (1) the injection equipment, (2) the wellbore annulus around and/or in the injection well and (3) the face of the well formation immediately around the injection zone, with the polymer gel to be produced as to be described.

It should be noted that there may be numerous sets of well bore conditions where the sequential differing injections comprising the subject improvement are involved. For example, a wellbore casing may be cemented from the top of the formation to a considerable level thereabove, whereby materials introduced under pressure have only the oil formation face in the wellbore to impact against. Yet further, in this case or in the case where packers are employed to isolate one or more portions of the oil formation face, there may have been (a) fracture(s) (such as (a) hydrofracture(s)) performed in the wellbore to aid production of oil in the initial stages of such oil production through initial pressure, loss of initial pressure, pumping, etc. As previously called out, the oil horizon may be cased off entirely and shot perforated and/or fractured at one or more levels.

Another variation of preparing the wellbore for the injections hereinafter to be described and being described is to merely set a single packer at the bottom of the oil sand, if the wellbore extends past the oil sand face, vertically. Still further, one or more additional packers may be employed (together with the positioning of perforations on the vertical injection pipe while closing the bottom end thereof) to force pressure only against a limited portion of the oil formation or two or more such.

All of these techniques of isolating the formation and portions thereof, do not constitute a part of the subject invention as all of them have been used at one time or another in prior art primary, secondary and/or tertiary oil recovery. Examples of numerous variations of such limited oil formation face treatment lie in the Ralph Spearow patents (and references thereof) issued in the 1950's and 1960's with respect to air injection into oil formations in special applications. Many secondary recovery techniques are richly represented in patents and other sources. Such would be just as applicable in fluid injections. There are additionally, in the references to the Spearow patents and, in the water flood secondary drive patents noted, many, many techniques for manipulating the wellbore face of an injection well (and that of (a) production well(s)) in a secondary or tertiary oil recovery system. The invention here is the materials used and the manner and order in which they are used, not in any particular mechanical arrangements of oil formation isolating, oil formation sealing, limitation of portions of the oil formation with respect to injection of fluids and recovery of fluids, etc.

Returning to the first example, there is first injection of a quantity of acidic water into the said formation through the injection well to the extent desired. This may be a very considerable quantity of such, yet, since most injections into oil formations are into the circumferential wellbore around the level of injection, a very considerable quantity of acidic water may be absorbed by the circumferential formation both horizontally and vertically thereinto without moving the water (acid) any great distance radially from the injection well. One extremity of injection of the quantity of acid water into the formation through the injection well would be where the acidic water is injected into the formation in the injection well until it is detectable at the (or a) production well or several or all thereof. During this injection, any oil or fluids that become available at one or more production wells may be produced, per se, including by pumping from the wellbore.

Secondly, after the injection of a quantity of acidic water into the formation through the injection well, to whatever actual extent and degree such is done, and, as well, after clearing the injection well bore and sand face of acid, thereafter there is injected a quantity of reversibly gellable, alkaline polymer solution, which solution gels upon one of neutralization and acidification thereof, into said injection well.

It is assumed that the initially injected acidic water largely follows the naturally high permeability paths and zones in the formation, either such, per se or those created by the application of a previously employed secondary and/or other tertiary method of oil recovery therewithin and before. Accordingly, when the injection of a quantity of reversibly gellable, alkaline polymer solution begins and continues, with such penetrating the formation circumferentially and peripherally to the injection well, it is assumed that such gellable alkaline polymer solution will tend also to seek zones, areas, paths, etc. of relatively high permeability. However, to the extent that the acidic water is in place therein, there will be, upon neutralization and/or acidification of the gellable alkaline polymer solution, gelling of said latter solution along the line or faces of the bodies of acidic water in the sand, also thrusting somewhat thereinto until the gel builds up into a condition where it repels further penetration of the reversibly gelable alkaline polymer solution into a given acidic water body or quantity located in a given place or zone in the formation.

Two things must be noted with respect to this second injection. In the first place, if pure water drive has been used as a secondary recovery method, the reversibly gellable alkaline polymer solution very well may not penetrate or will pass along the surface of not only acidic water containing high permeability zones, but also the water, per se or brine containing such. This means that this more dense solution well may produce additional oil at one or more production wells surrounding the injection well both by (1) sealing off acid water containing zones by gelling and penetrating and (2) driving oil from less permeable zones in the wellbore clear out to the recovery well(s) or production well(s), not displacing water and brine deposits to any great degree.

There are a number of options which follow after a substantial injection of acidic water into a given injection well and, thereafter, a substantial injection of gellable alkaline polymer solution.

(1) Assuming substantially stiochiometrically equal quantities of acid water and polymer solution have been injected into the well, thereafter water drive may be reinstituted until, once again, the oil/water ratio at the production well(s) becomes unacceptable or less than commercial.

(2) If the polymer solution injection is continued until it is detected at the production well(s), or near such, again, when the oil/water ratio in the production well(s) drops, this injection may cease. In this particular case, a further injection of acidic water may follow until such is detected at the production well(s) or, again, oil production at the recovery well(s) drops below commercial.

(3) Once quantities of acidic water and polymer solubilized alkaline mixture injections have been made substantially stoichiometrically equal, a further injection of acidic water may be made at the injection well. This may acidify some or all of the waterlogged high permeability zones deeper in the formation away from the injection well, thus to prepare for another injection of reversibly gellable alkaline polymer solution. The latter gelling will, to a greater or lesser extent or entirely, bar a further penetration of later used drive liquid in the presumably water filled and/or acidic water filled high permeability zones deeper in the formation. Or the gel block of the nearby high permeability zones may be lessened or removed in the event NaOH is injected (4) There is thus always the option of thereafter injecting a further quantity of acidic water into the injection well, but this (at best) simply will make some higher permeability zones deeper in the formation acidic. The second option is injecting quantities of reversibly gellable alkaline polymer solution to block off and isolate more permeable formations from less such before or after the former. Since this solution is always more dense than plain water, at each point it may be used partially, fully or deeper than the penetration of the first and/or second acidic water injection. Still further, after the second gel block off of the depths of the formation beyond the first gel block off, drive water may be injected into the well to further scavenge the lower permeability zones until, again, the water/oil ratio at the production well(s) is again uneconomic.

(5) The option of injecting acidic water into the formation through said injection well or wells can extend until the acidic water is detected at one or more of the production well(s). This would signal or at least imply that at least some of the high permeability zones of water left over from the earlier water flood have been acidified sufficiently to cause gel of the alkaline polymer solution in question Thus, at this point, the gellable, alkaline polymer solution may further be injected into the injection well(s) until (a) such is detected at one or more production well(s) or (b) the oil/water recovery ratio becomes uneconomic.

With respect to the injection of alternative quantities of acidic water and polymer solution in either order, the operator will preferably inject a quantity of one of water or brine into the formation after the first type of injection (acidic water or polymer solution) before the second active ingredient injection (polymer solution or acidic water injection) into the sand whereby to: (1) clean out the injection equipment, (2) clean out the wellbore of reactable material and, further, (3) clean out the wellbore surface and some depth thereof (to whatever depth is most efficient for the process in question) before permitting gelation of the polymer.

It should also be understood that, as possibly previously noticed, fracturing of the formation between two set packers on an injection pipe may be employed before, during or after a first phase of acidic water/alkaline polymer solution injection. Yet further, a casing may be run initially into the well before any of the subject treatment or at any stage thereof, cemented, and perforated in the zone of the oil formation in which it is desired to inject the materials.

It is understood that all of these processes may also be carried out in an oil formation wherein there are a plurality of injection wells spaced among a plurality or pluralities of production wells. Optimally for production from one injection well is the case where at least two or more production wells surround or are relatively evenly radially displaced around the injection well.

Where there is an oil formation with a group of wellbores penetrating same in a fairly dense, closely related manner, it should be understood that one or more central well(s) may serve for a considerable time as (an) improved injection well(s) with the closest surrounding wells thereto serving as production wells. After the subject process is exhausted (including later description thereof) from one or one set of injection well(s), any one of the production wells or other wells in the formation related or spaced near the original injection well itself, may be pressed into service as an injection well. The original injection well(s) itself (themselves) may be changed to (a) then production well(s) or at least sensor containing well.

Initial Injection Polymer Solution

One group of polymer solutions which are reversibly gellable is a solution (an alkaline solution) of polysaccharide polymer produced by cultivating bacteria of the genus Cellulomonas including at least one of ATCC 21399 (Cellulomonas sp.), ATCC 482 (*Cellulomonas flavigena*), ATCC 537703 (*Cellulomonas flavigena* strain KU or 819) and ATCC 491 (*Cellulomonas uda.*) in a suitable solubilizing medium.

With respect to the subject method for the enhanced recovery of oil by injection of flooding reversibly gellable fluid into a subterranean oil bearing formation through an injection well extending from the surface of the earth into the formation, the purpose and effect of such injection being to displace oil within the formation from the injection well towards at least one production well spaced at a distance away from the injection well, the following are the second basic procedures involving initial polymer solution injection.

There first is injected into the formation through the injection well a quantity of alkaline, reversibly gellable, polymer solution, which solution gels upon one of neutralization and acidification thereof This is the reverse of the previously described process and procedure where the acid water initially was injected into the injection well and the formation around the injection well. To ungel a formed gel, NaOH or its alkaline equivalent (KOH or alkaline polymer solution) is injected.

As previously stated with respect to the initial acid injection method, any part or parts of the formation well bore face may be isolated for the subject injection or the entire face of the formation. There may or may not be one or more fractures already produced in the wellbore face in the oil formation. One or more fractures, per se or additionally, may or may not be produced prior to the injection of the first constituent of this process, here the alkaline, reversibly gellable, polymer solution. As has been noted at least to a certain extent in the previous writings of this case, since the alkaline, reversibly gellable, polymer solution is of greater density than water, simply injecting such into the formation or specific parts thereof may cause a drive of at least some additional oil towards and into the production well(s). This is the case whether the polymer solution injection is but a relatively small fraction of the radial distance to the nearest production well, a larger fraction thereof, a substantial fraction thereof or the entire distance thereto, whereby the polymer solution may be detected at the production well. After this injection water/brine or air injection is carried out to a sufficient extent to clear the injection equipment, the wellbore and some depth into the formation.

After any one of the polymer solution quantity injections noted above, a quantity of acidic water or $CO_2$ may be injected into the same formation or parts thereof through the same injection well, whereby, when the acidic water or $CO_2$ contacts the polymer solution in situ, such, whether it is in largely high permeability zones or portions thereof or yet in lesser permeability zones, at least some of the polymer solution in the formation, when neutralized or acidized, will gel within the formation, thus tending to block off or restrict entry into the relatively higher permeability zones into which the polymer solution has penetrated, if any, and the zones scavenged by the said polymer solution in the initial injection.

While this is done, any oil driven by the said acid/-$CO_2$ injection may be produced at the production borehole(s) so long as such is economic. To the extent the acidic water or $CO_2$ penetrates the oil formation and contacts any of the quantity of polymer solution therein (regardless of how the polymer solution has found its way into and through at least some of the formation), intimate contact of the acid water and polymer solution will, to the degree the acid water retains its acidity and, further, to the degree the polymer remains in the polymer solution to be contacted by the acid water, cause gelling and sand pore blocking to take place. One can see that relatively less dense, relatively denser and relatively densest gellation of the polymer by the acid may take place, thereby giving, conceivably, gel layering which layers of gel in the formation may to a greater or lesser extent, resist penetration thereinto of other liquids and fluids yet to be injected in the formation.

When a small fraction, a larger fraction, a considerable fraction and/or all of the formations surrounding the injection well(s) have received, first, the gellation process caused by the gelling of the first injected polymer solution by the second, following injected acid solution or $CO_2$, there then is the option of injecting additional liquids to produce additional oils and/or further prepare the formation for production of additional oil therefrom.

A first option is to inject enough acidic water to have such be traceable at one or more of the production wells. While this may or may not produce any additional oil at the production well, this acid injection will prepare those parts or some parts of the formation not yet having any gel treatment thereof to be gelled. Thus, a logical decision for the sequentially third injection (after polymer solution, then acid water) is more polymer solution.

To the extent acid water has preceded it, this injection of polymer solution will, presumably, gel and block off more high permeability zones as well as swept zones and, at least to some extent, drive oil before it to the production well where such may be produced when economic. The permutations and combinations of successive injections beginning with the injection of polymer solution seem fairly evident. When the gellation of polymer in the oil formation with respect to a given injection well or set thereof has been essentially completed out to said production well(s) or close to it (them), then it is presumed that further injection of water, per se or polymer solution will drive oil out of the lower permeability areas of the formation (such not blocked off by the gellation), thus to produce considerably more oil in an economic ratio at the production well or wells.

This situation is analogous, but not identical to, the sequence of acid water injection, then polymer solution injection discussed above. In either case, where a gellation has been produced, following a first injection of acid water or a first injection of polymer solution, if there is a gel of greater or lesser dimension produced, in the first case, by polymer solution injection and, in the second case, by acid water injection, any NaOH or alkaline equivalent injection thereafter may tend to dissolve the gel formed to a greater or lesser degree. To the extent (1) a dissolved gel, (2) acidizing or neutralizing fluid, per se or (3) alkaline water/polymer solution exist in the oil sand, with respect to (2), further injection of polymer solution thereinto will tend to cause more gelling to the extent such polymer solution is neutralized or acidified. Acid fluid or $CO_2$ injection will tend to regel (1) and/or gel (3).

When a third agent such as water or brine is employed in the sequence of the injections, in order to effect gellations within the formation, the alkaline polymer solution must reach a neutral or an acidified state or where polymer solution, per se, is present, an acidified solution or $CO_2$ must reach same, whereby to form gels by neutralization, etc.

Where limited quantities of materials are desired to be utilized for limited additional production time at the production well(s) the following may occur:

(1) A quantity of acidic water is first injected into the formation through the injection well; thereafter, a quantity of reversibly gellable alkaline polymer solution is injected, which solution gels upon one of neutralization and acidification thereof into the formation around said injection well;

(2) Oil may be produceable economically from the production well during, first, (unlikely) the injection of acidic water, per se and, thereafter, (likely) during injection of said polymer solution, per se;

(3) After at least some formation gelling, a drive liquid or fluid may be injected into the injection well while producing at least some oil from said production well(s);

(4) Another quantity of acidic water may thereafter (after (4)) again be injected into the formation through the injection well and, following this:

(5) Another quantity of reversibly gellable alkaline polymer solution of the same previously described sort may be injected into the injection well to extend the gelling;

(6) Oil may be produced from the production well(s) during, first, the second injection of acid water and, thereafter, during the second injection of said polymer solution;

(7) Yet thereafter, a drive liquid (water or solubilized polymer) may be injected into the injection well whereby to produce at least some oil from said production well.

NaOH injections may be employed to dissolve earlier gellings, such solutions moveable further into the formation by water, brine or polymer solutions of this and other type, later to be elsewhere gelled by subsequent acid or $CO_2$ injections.

As previously noted, the options of (1) water or brine may be used for the drive liquid or (2) more alkaline polymer solution and/or (3) more acidic solution or (4) another liquid with or without other substance(s) therewithin.

Naturally, the acidic water may initially be injected in the formation until it is detectable at the production well(s), whether or not any additional oil is produceable at the production well in this process. Next, the polymer solution may be injected into the formation in one or more injections until it is detectable at the production well(s), including very possibly producing oil in commercial quantities available in the formation at the production well(s) in said latter process.

In any case, in order to avoid plugging, clogging and coating the injection equipment, gelling materials in the wellbore and gelling across the annulus and into the wellbore face, some neutral (non gel causing liquid or gas) preferably is used to clean out the injection equipment, the wellbore annulus and the injection face of the formation before further injecting reacting or gelling substances thereinto. (Or NaOH, which is not preferred, except in an actual foulup gelling.)

The opposite method involves first (1) injecting a substantial quantity of reversibly gellable alkaline polymer solution (which solution gels upon one of neutralization and acidification thereof), into the formation through and surrounding the injection well, said quantity either insufficient or sufficient to be detected at one or more of the production well(s);

(2) Thereafter, a substantial (such as stoichiometrically equal) quantity of acid or $CO_2$ (which solution gels upon one of neutralization and acidification thereof), is injected into the injection well;

(3) With respect to each above sequential injection of the (1) and (2) materials into the formation, if oil appears at any of the production well(s) in commercial quantities, such may be produced;

(4) Thereafter, a further quantity of reversibly gellable alkaline polymer solution is injected into the injection well of substantial quantity;

(5) Next, a substantial quantity of acidic fluid or $CO_2$ is injected into the said formation through the injection well whereby to gel, upon one of neutralization and acidification thereof, at least some of the second injected quantity of reversible gellable alkaline polymer solution in the formation; and (6) Producing at the production well(s) any additional oil appearing thereat during said second set of injection.

Thereafter, optionally or preferably, a drive fluid (water, brine, acidic water (not preferred), $CO_2$, air or additional reversibly gellable alkaline polymer solution) may be injected into said injection well(s) whereby to produce at least some additional oil from said production well.

It should be understood that one of the drive fluids (not acidic water, $CO_2$ or soluble polymer solution) disclosed in the prior art, including other polymer containing liquids, such also including water, may be employed at any time in these processes as a drive liquid to substitute for water, per se, brine or the other components of the specific process here disclosed. This is in all cases mentioned.

Where sequential alkaline polymer solution and acid water solution or $CO_2$ injections, in whatever order, are employed with respect to this process, preferably some nonreactable or nongelling liquid or fluid, such as air, water or brine, should be employed to clear the injection equipment, the wellbore, per se and the immediate wellbore formation face before the opposite member of the pair of the gel producing materials follows that one immediately before injected. NaOH (alkaline solution) injection will clear any actual equipment, wellbore (annulus) and formation face (and deeper) gel effects not desired.

To carry the maximum amount of polymer into the depths of the sand/formation, gelled earlier stages may be dissolved in NaOH (alkali) and driven further into the sand by injection of more alkaline polymer solution and then this deeper penetrating body of alkaline polymer solution gelled by acid or $C_2$ injection.

Miscellaneous

With respect to sequential injection of the gelling agents (acid or $CO_2$ then alkaline polymer solution or alkaline polymer solution, then acid or $CO_2$) it has been noted above that it is best to clear up and/or clean out the injecting equipment, the well bore annulus and the face of the formation or perforated casing between successive reactant or regent injections. This may be accomplished, first, by injecting air, water or brine following each injection whereby to have a circumferential plug of such fluid through which, in the next stage, the first one of the gelling agents may dissolve backwards thereinto and the second, other gelling agent may dissolve forwards thereinto to ultimately make gelling contact. On the other hand, where there is a wellbore annulus surrounding the injection pipe or tubing, a liquid may be used to backflush the annulus and the injection equipment forced into the annulus and back up the injection pipe or tubing such as water, brine or drilling mud. Gases such as air and nitrogen may also be used in this procedure. When this has been done, then either acid, etc. or polymer solution (the next injection stage) may be injected through the injection pipe or tubing into the annulus and thence into the earth formation surrounding such.

If there is any gel plugging that interferes with the process in or on the injection equipment, wellbore annulus or wellbore face, alkaline solution (NaOH, KOH, etc.) or polymer alkaline solution (KOH or NaOH polymer solution, etc.) should be injected to dissolve (solubilize) the gel.

In addition to the preferred acids comprising hydrochloric acid (HCl) and acetic acid, sulfuric and nitric acids will also work as a reactant or reagent, but are considerably more corrosive. With respect to hydrochloric acid, for example, the polymer solution in 0.1 N sodium hydroxide requires an equivalent amount of 0.1N HCl to get all the polymer precipitated. Likewise, the polymer solution in 1.0 N alkaline polymer solution requires an equivalent amount of 1.0 N hydrochloric acid to gel the solution.

Where there are a plurality of production wells and any particular stage in the subject process is being used and one or more of the production wells begins producing a lower than satisfactory oil-water ratio, while the other well(s) are producing satisfactory oil/water ratios, the operator may merely close off the less productive well(s) until the other production well(s) arrive at the same unsatisfactory condition. Then it is the time to move to whatever the next stage of the process is going to be. Alternatively, with respect to a less productive production well, this well can be used as a polymer injection well (alkaline polymer solution injection well) until the production oil-water ratio at that well is corrected.

Alkaline (NaOH, KOH, polymer solution, etc.) injection serves these useful purposes: (1) To clear the clogged injection wellbore, injection equipment and wellbore face; (2) dissolve the gel body or bodies of polymer in the formation and move same deeper into the formation; and (3) clear any production well gel cloggings if such occur. Injecting the alkaline polymer solution, per se, particularly with a stronger alkalinity, will achieve the same purposes as alkali itself.

With respect to the order of sequence of injection of solubilized polymer and acid, if the polymer is cheap, use the polymer. If the polymer is expensive, then sacrifice acid.

The portion of the oil formation and the wellbore that is to receive the injection of the fluids of the subject invention may be isolated in any suitable conventional manner. Thus, if the wellbore casing is merely cemented to the top of the oil sand or well formation, then an input pipe or tubing (with a plugged lowest end and perforations opposite the wellbore zone to be treated) inside the casing may be rigidly set in the wellbore with packers filling the annulus between the injection pipe and the wellbore face, provided that the wellbore face will hold the seal at the packers under the necessary pressurization. In this process, the packers are set above and below the vertical area of the wellbore face to be worked. Such portion of the wellbore face in the formation may include a previously fractured wellbore face portion intended to increase permeability and recovery and/or injection efficiency in the zone fracture. Further, after the packers are set or the critical portion of the wellbore face is otherwise isolated, then fracturing may or may not be employed either before the beginning of the subject process or thereafter at any stage during same.

In another alternative, the wellbore casing is extended through and cemented through a good portion or the entire vertical cross sectional face of the sand. In this case, in certain heights and portions of the face of the casing and the cement surrounding, same may be perforated or shot in conventional manner to give access therethrough to the formation. In this case, an injection tubing with the lower end closed and perforations in the wall of the tubing to be set opposite the perforated zone and the oil sand may be run into the wellbore and set in position with packers to the casing above and below the wellbore face zone to be worked.

Where the particular oil horizon, sand or formation includes a highly porous, readily collapsing wellbore face or there is a particular quantity of loose formation or sand in the wellbore itself, the following process is useful. It is first desired to consolidate any loose formation particles or sand into the mass at the bottom of the wellbore. Either polymer solution or acid is run into the wellbore in the critical zone followed either by equipment clearing brine, water, nitrogen or air or, alternatively, the excess first fluid may be backflushed as set forth above. Then the other reagent or reactant is injected to gel the loose mass of sand. If it is desired to first plug or permanently plug the horizon in the wellbore or wellbore annulus, one need run in only as much air, water or brine required to clear the injection pipe or tubing.

If a lot of loose sand has been gelled in the lower portion of the wellbore, in the formation, or below the formation, after the initial gelling to consolidate the loose sand, packers may isolate the portions of the wellbore face or perforated wellbore casing for treatment by one or more of the subject processes.

Referring to FIG. 1, therein is shown a schematic procedural delineation of the successive steps in the extraction and purification of the exopolysaccharides useable in this invention. At 10 is the culture of bacteria in its suitable medium. At 11, with respect to the Cellulomonas bacteria, the aggregated cells may be permitted to sediment. At this point, after pouring off the supernatant above the aggregated cells, the aggregated cells may be dissolved in alkali (NaOH or KOH) thus giving solubilized polymer and the bacterial cells. This stage, at 11, after pouring off the supernatant, may be employed in the subject process once the polymer is dissolved in alkali with the cells remaining in suspension at 11a.

At 12 there is a centrifugation step as indicated resulting with supernatant 1 to the right at 13. This supernatant is discarded. The discard of supernatant 1 at 13 leaves at 14, to the left, the first cell pelletization which includes both the cell bodies and the precipitated polymer. At 15 alkali (here typically 1N sodium hydroxide) is added to the first cell pelletization step and, upon stirring, the polymer is dissolved. After another centrifugation step at 16, the second supernatant at 17 is poured off, neutralized with acid at 18 which precipitates the insoluble polysaccharide polymer at 19. Most of the polymer is recovered at this stage.

The residue from centrifugation step 16 is a second cell pelletization stage at 20 and has a small amount of polymer. As in the case of the first pellitization stage, one normal sodium hydroxide may be added with stirring at 21. There is then a third centrifugation step at 22 which leaves, after pouring off the supernatant, the third stage of cell pelletization at 23. Supernatant 3 at 24 is then neutralized with acid at 25, whereby to precipitate the remainder of the insoluble polysaccharide at 26. The material at stages 19 and 26 may be used in the process by dissolving the polysaccharide in alkali to achieve an alkaline polymer solution without the cell bodies therein. If there is no objection to the cell bodies being included in the alkaline polymer solution used in the processes, which is usually the case, such is useable at stages 11a and 15.

As previously stated, FIG. 2 is a graph showing the effect of nitrogen concentration on biomass and hydrogel production. Bacteria were grown in flask cultures in CM9 medium containing the indicated amounts of ammonium chloride and 4% glucose. The cultures were incubated with shaking (250 rpm) at 30° C. for 72 hours. On the graph, the triangular symbols show biomass and the circular symbols show hydrogel.

With respect to FIG. 3, this figure shows the time course of growth and polysaccharide production. Bacteria were grown at 30° C., with rapid aeration, in a biostat table top fermenter (with pH maintained at 6.7). CM9 culture medium contains 0.02 N $NH_4Cl$ and 2% glucose. With respect to the symbols, the circular dots indicate acid; the triangles indicate biomass; the squares indicate polymers and time point A shows where aggregation was first observed by phase contrast microscopy. Time point B shows macroscopic aggregation.

Figure 4:
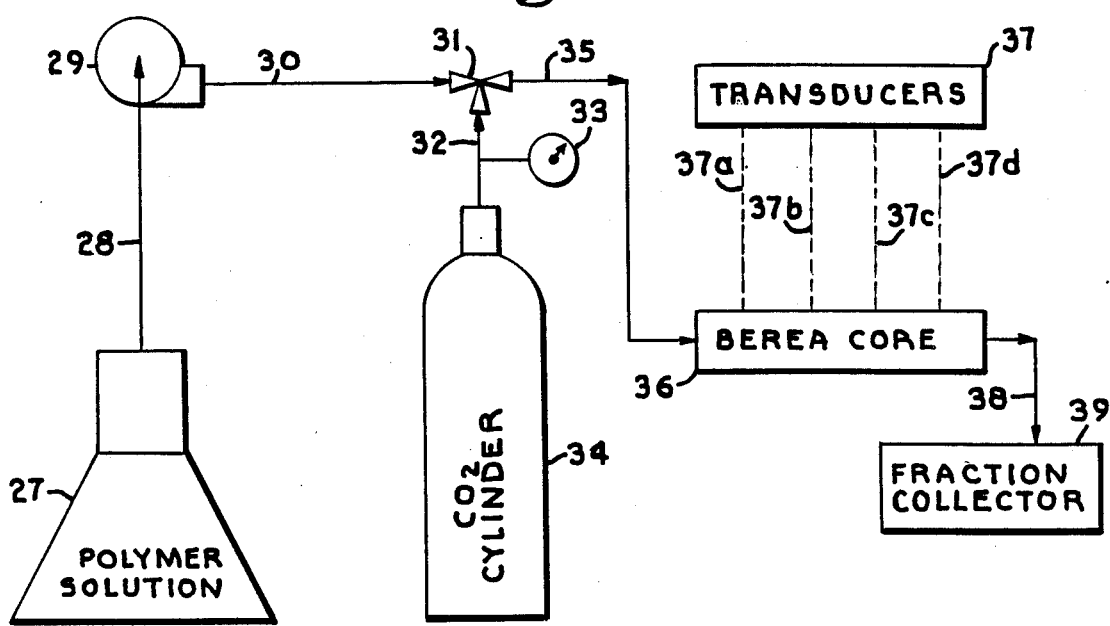
FIG. 4 is a schematic drawing of a test process to evaluate the injection into an oil sand core of one of the alkaline polymer solutions of this invention with alternate injections of $CO_2$ gas with respect to producing oil from said oil sand core.

Referring to FIG. 4, this is a schematic flow diagram of producing carbon dioxide induced gellation in an oil sand core. The main components of FIG. 4 are a container or flask of alkaline polymer solution at 27, line 28 to pump 29 and line 30 from pump 29 to three way valve 31. From one of the two outputs from the valve, line 32, having pressure gauge 33 thereon, receives carbon dioxide from carbon dioxide cylinder 34. Line 35 goes from the second output of valve 31 to the input side of core 36. Thus it can be seen that, alternatively, alkaline polymer solution and carbon dioxide may be fed to the core 36 through line 35. One or more inlets to the valve may be added as discussed herebelow. Pressure transducers 37 and 37a–37d, inclusive are linked to successive portions of the core sample. From the output side of core 36, line 38 goes to fraction collector 39.

Petroleum reserves which are reported worldwide are actually estimates of the producible oil based on the present technology. Approximately two-thirds of the original oil in place will remain trapped in the reservoir after primary *and* secondary production. This constitutes hundreds of billions of barrels of oil known to exist but which cannot be produced by present technology. A discovery made at KU is aimed at production of these currently unavailable vast reserves.

The initial stage in producing oil from a reservoir is called primary production. Production at this stage is achieved by natural reservoir energy. Examples of natural driving energy are gas which evolves from solution out of the oil, expansion of free gas, or gravity drainage.

Most of a reservoir's oil remains in place after natural energy is depleted. Natural energy depletion can be augmented by injecting gas or water. Oil recovery processes which use these fluids are called secondary recovery methods. Water injection is commonly known as "water flooding" and the various gas injections are termed as "pressure maintenance".

Water or gas, in secondary recovery, after being injected into reservoir, are able to sweep only a small additional fraction of the residual oil in the reservoir thus tending to by-pass most of the oil. This causes early breakthrough of the injected fluid to the surrounding production wells. The water/oil ratio in the case of water flooding and gas/oil ratio in the case of gas injection become eventually so large that the oil production ceases being economical any more. The field at this stage must be either abandoned or treated by more sophisticated techniques called enhanced oil recovery methods, which are expensive.

One approach presently under investigation is injecting some kind of chemicals to block off the already swept zones and redirect the injected fluid into the oil bearing regions thus to produce additional oil or, in other words, improve sweep efficiency. Such processes are generally called permeability modification. For example, a mixture of a polymer solution and some kind of heavy metal ion such as dichromate and a reducing agent are injected into the reservoir. The chemical reactions among the components produce a three-dimensional crosslinked gel which plugs the already swept zone. Such processes are referred to as in-situ gelation. Such processes are complex and involve a large number of variables. Controlling these variables such as concentration of the metal ions, polymer, reducing agent, etc. at the field scale is at best extremely difficult, if not impossible.

The permeability modification method discovered at the University of Kansas accomplishes the in-situ gelation process without the complexity of such chemical reactions involved. A new bio-polymer, produced by certain soil bacteria, has been discovered. The polymer is water insoluble but dissolves in dilute alkali. When such alkaline solutions are neutralized, the polymer precipitates. That is, by injecting polymer solution followed by acid or vice versa, the gel can be placed in-situ within the reservoir. Laboratory tests on rocks similar to those of petroleum reservoirs have been successfully performed and in-situ gelation achieved. The subject gellation process, contrary to other techniques, is reversible. That is, the gel can be dissolved in alkaline solution and re-gelled again by titrating with acid. The process is simple and has no negative environmental implications. Production of polymer and its separation from the cultured media is simple and inexpensive. The bacteria can be cultured in any of a variety of cheap substrates such as corn starch, glycerol and even molasses.

Professors Clarence C. Buller, Department of Microbiology, and Shapour Vossoughi, Department of Chemical and Petroleum Engineering at Kansas University, are the two investigators involved in this invention. The subject joint patent application is being filed through the University. A paper entitled "Permeability Modification By In-Situ Gelation Using A Newly Discovered Bio-Polymer", authored by the two present inventors, will be presented at the 64th Annual Technical Conference and Exhibition of the Society of Petroleum Engineers to be held Oct. 8-11, 1989 in San Antonio, Tex.

Returning to FIG. 4, core 36 is initially saturated with brine. The permeability of the core is determined, knowing the pressure drop and the brine flow rate. The brine is then displaced by oil to its connate water saturation, i.e. the saturation that cannot be reduced further by passage of more oil through the core. A carbon dioxide injection is initiated and the oil recovery is measured. Injection of carbon dioxide continues until the breakthrough of $CO_2$ occurs. Alkali solubilized polymer injection will then be initiated at this stage and the additional oil recovery will be measured. Polymer injection will be stopped at polymer breakthrough and $CO_2$ injection will be resumed.

When in-situ gelation of polymer induced by $CO_2$ occurs, then a change in the pressure gradient along the core will be observed. Using a series of pressure transducers, equally spaced along the core, the pressure gradient along different segments of the core will be plotted versus time. Higher pressure gradient is an indication of successful gelation. A spread in the length of the gelation zone will be evident from the spread of the zone of high pressure gradient. Such an observation, combined with the increased oil production is an indication of a successful process.

Figure 5:
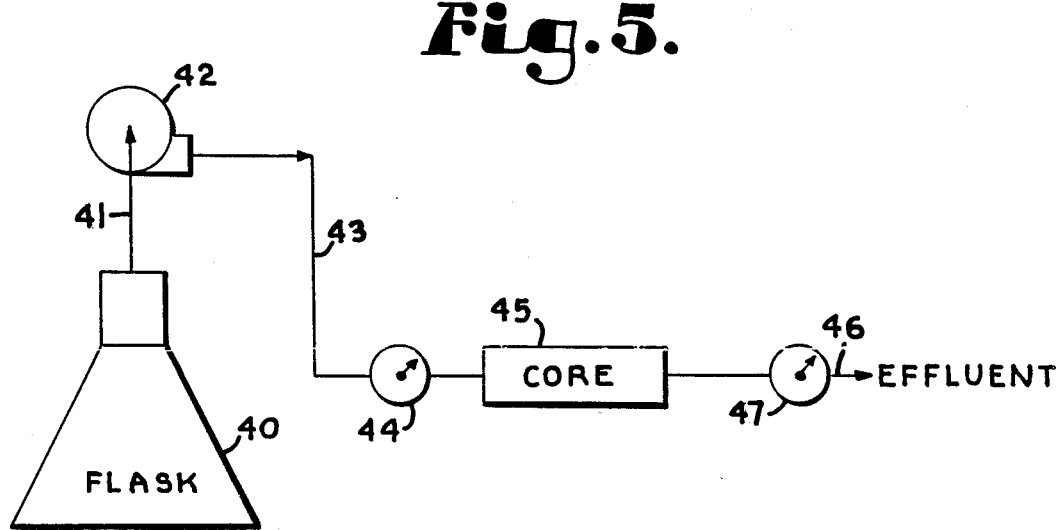
FIG. 5 is a schematic diagram of a process useable to measure oil production from an oil sand core after water drive therethrough.

FIG. 5 shows a simple core testing process wherein container or flask 40 may contain either alkaline polymer solution or acidic water or two flasks may be provided with one having the alkaline polymer solution and the other having the acid therein. Through line 41 one of acid or alkaline polymer solution is first passed to pump 42 whose discharge line 43 has pressure gauge 44 thereon. Line 43 leads into the selected input side of oil sand core 45. The outlet line 46 from the other (selected output) end of the core preferably has gauge 47 thereon. A battery of transducers like that seen in FIG. 4 is connected to successive longitudinal zones of the core 45.

With respect to FIG. 5, the core or sand pack 45 is initially saturated with brine. The permeability of the sand core, sand pack or sand bed is determined, knowing the pressure drop and the brine flow rate. Porosity of core 45 is determined by knowledge of the volume of the core, the weight of the core and its intensity. Brine is then displaced in core 45 by oil to its connate water saturation.

Oil injection is then switched to a solution of the polymer in container 27 (polymer dissolved in alkali). This solution is injected through lines 41 and 43 into the sand pack until at least the first segment of the core or sand pack is flooded. This is determined by the pressure drop reading of the first segment compared to the rest of the sand pack. The difference in the pressure drop reading is due to the difference in the viscosity of the bio-gel solution with respect to that of the brine.

The injection of the polymer solution may be stopped at this stage and switched to an acidic solution such as hydrochloric acid, acetic acid (or gas such as $CO_2$). Such acid or gas would come from another line (not seen) joining line 43 with a pump thereon. Gellation starts in the first segment (or thereabouts) of the core of the sand pack because of the direct or delayed mixing of the acidic solution (or $CO_2$) with the alkaline polymer solution already residing in that segment. This is detected by increased pressure readings because of the partial plugging caused by the precipitated gel.

Input of the acid solution or $CO_2$ is then switched to input of alkali, per se or the alkaline polymer solution. The first gel breaks in the presence of the alkali or the solubilized polymer solution, at least in part, thus to produce a more dilute alkaline polymer solution. Injection of the alkali or alkali solution polymer is continued until the resolubilized alkaline polymer solution reaches the second or third segment of the sand pack. Input is then switched back to input of the acid solution (or $CO_2$), such through line 32, to create the reoccurence of the gellation in the second or third segment of the sand pack.

Alternatively, the acid solution (preferably hydrochloric or acetic acid) is first injected into the core through lines 41 and 43 followed by the injection of the polymer solution from container 40 and lines 41 and 43 before or after nonacidic water injection. This latter order of events will not work with carbon dioxide.

The sequential injection of the acid and alkaline polymer solution (or vice versa, including optional use of $CO_2$) is continued until the alkaline polymer solution is produced from the exit end of sand pack 45. The use of this method and process produces significantly higher oil recovery. Such recovery depends on how well the water bypassing channels are plugged during the period(s) of gellation and gel recurrence.

TABLE 5

Cellulomonas Cultures Tested For Production Of Polysaccharide Hydrogel

| Bacteria | ATCC | mg bacteria/ ml of culture (wet weight) | mg of hydrogel/ mg of bacteria |
|---|---|---|---|
| C. flavigena KU | 53703 | 41.6 | 3.67 |
| C. sp. | 21399 | 36.0 | 3.71 |
| C. uda | 491 | 21.0 | 2.45 |
| C. flavigena | 482 | 18.7 | 1.30 |
| C. cartae | 21681 | 9.7 | 0.0 |
| C. gelida | 488 | 8.1 | 0.0 |
| C. fimi | 15724 | 7.2 | 0.0 |
| C. biazotea | 486 | 7.1 | 0.0 |
| C. fimi | 484 | 6.9 | 0.0 |

Bacteria were grown in minimal media containing 0.0075 M $NH_4Cl$ and 1% glucose. Cultures were incubated at 30° C., with aeration, for 72 hours.

It should be observed that injection of the subject alkaline solution of polysaccharide polymer differs from all prior art polymer injections. That is, the former is caustic polymer solution injection, while the latter are merely water polymer solutions. Thus the use of the alkaline solubilized polymer is more effective, per se, than the injection of prior non-caustic polymer solution injections. The gelling, resolubilization and regelling features of this invention and process, then, are yet further, extraordinarily features of this basic new alkaline polymer solution in its use in secondary and tertiary oil production.

Table 5 shows the results of 9 (perhaps 8 or 7) Cellulomonas bacteria cultures tested for production of polysaccharide hydrogel. The first two (C. flavigena KU (819) ATCC 53703 and C. sp. ATCC 21399) are extremely similar with respect to (1) milligrams bacteria/-milliliters of culture (wet weight) and (2) mg of hydrogel/mg of bacteria. These are the two best producers. Then, No. 3 C. uda, ATCC 419 provides considerably less of such than (1) and (2) given above. The fourth bacteria strain C. flavigena, ATCC 482 is like C. uda with respect to mg bacteria/ml of culture (wet weight), but has considerably less mg of hydrogel/mg of bacteria. Of the five next strains, one can see that there is provided very considerably less such than (1) and (2) and than with respect to the four leading bacterial strains. With this regimen such are unproductive.

Thus it may be stated that those organisms in the above list which produce polymer have a ratio of mg hydrogel/mg of bacteria (i.e. last column) which is greater than 0. The hydrogel is a measure of the polymer. The nonpolymer producers of Cellulomonas have the latter ratio of 0.

Returning to the subject of consolidating oil sands, it must be recognized that the producing faces of certain oil wells at the sand in the wellbore and in the earth formation underground may slough and release sand at the input and/or production points or zones in the wellbore in at least certain situations. Such eroded or eroding sand face well may hinder optimum injection and-/or production. Accordingly, it is most desirable to consolidate or fix the surrounding cylindrical bore adjacent sand formations in these cases from the (perhaps considerably eroded) face of the oil formation outwardly at the very least several feet to a fairly considerable depth. When this is the case, there may be, first, acid solution injected into the formation for, say 3 to 100 or several hundred feet, followed by injection of the alkaline solution of solubilized polymer (with or without the cell bodies) to the same extent. Alternatively, the solubilized polymer in alkaline solution (with or without the cell bodies) may first injected into the wellbore to the extent that it is desired to consolidate the wellbore face and sand behind it. In the latter case, subsequent acid solution or $CO_2$ injection is employed to gel the reactant materials at the wellbore face out through the zone of consolidation desired or provided for. At this point, because there remain (in the sand) more or less permeable zones, pure alkali (NaOH KOH, etc.) or alkaline polymer solution may be injected into the well formation where the said gel dissolving alkali or alkaline solution operates to finger through the consolidation zone so that injection as previously described or production at a production well with respect to the processes in question may be undertaken.

Yet further, in addition to or alternatively with respect to the alkali penetration of the consolidation zone for injection or production, the formation can be fractured within the injection or production working height of the sand from the wellbore, thus to give a ready channel for input into the formation or out take therefrom. With a fracture, such may be treated or not with alkali or alkaline polymer solution before the injection into (or production from) the wellbore face (oil sand formation) is undertaken. In the manner described, the sand face in the wellbore and the producing sand radially therearound is consolidated or held while still giving a desirable productivity index.

Returning to FIG. 1, at 11a is shown a variation on the schematic previously described where, once the aggregated cells are allowed to sediment, the supernatant is then poured off and sodium hydroxide or other alkali is added to the sediment and stirred, which actions produce solubilized polymer and the separated (killed) bacterial cell bodies. This solution may be employed as the alkaline polymer solution in all of the processes hereinbefore described.

It should be further understood with respect to FIG. 1 and its flow options, at 17 with respect to supernatant 2, when such is neutralized with acid at 18, most of the polymer is recovered at 19. However, such additional solubilized polymer as may be still present is taken through stages 20 and 21, thereafter centrifuged to remove the rest of the cell debris, with the balance of the solubilized polymer carried over into supernatant 3 which, upon neutralization by acid precipitates the balance of the water insoluble polysaccharide.

Thus it may be seen that the aggregated cells (alive with their capsule) may be taken from step 7, the bacteria killed with sodium hydroxide and the solubilized polymer and cell debris and bodies therewith are available for injection into the formation.

This case employs at least some of the bacteria and the polymers therefrom disclosed in U.S. patent application Ser. No. 137,367 filed 12-23-87 and entitled "Water Insoluble Polysaccharide and Method of Production Thereof". This case is an improvement over this earlier filed application.

From the foregoing, it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims As many possible embodiments may be made of the invention without departing from the scope thereof, it is to be understood that all matter herein set forth or shown in the accompanying drawings is to be interpreted as illustrative and not in a limiting sense.

We claim:

1. In a method for enhanced recovery of hydrocarbon fluids by the injection of a flooding fluid into a subterranean hydrocarbon fluid bearing formation through an injection well extending from the surface of the earth into the formation, to displace in situ hydrocarbon fluids from the formation towards at least one production well spaced at a distance away from the injection well, the improvement which comprises:
    (1) first injecting a quantity of acidic water into the said formation through said injection well,
    (2) thereafter injecting a quantity of reversibly gelable, water insoluble, alkaline beta 1,3 polyglucan homopolymer solution, which solution gels immediately upon one of neutralization and acidification thereof, into said injection well and
    (3) thereafter injecting a drive fluid into said injection well and producing at least some hydrocarbon fluids from the said production well.

2. A process as in claim 1 including injecting a quantity of one of water and brine into said formation after the acidic water injection and before the polymer solution injection.

3. A process as in claim 1 including clearing the injection equipment, wellbore annulus and wellbore face of acidic water before injecting the said alkaline polymer solution.

4. A process as in claim 1 wherein the said acidic water is injected into said formation until it is detectable at the production well, including producing any oil that becomes available at the latter in said injection process.

5. A process as in claim 4 wherein the polymer solution is injected into the said formation until it is detectable at the production well, including producing any hydrocarbon fluids that may become available at the production well in said injection process.

6. A process as in claim 1 wherein the polymer solution is injected into the said formation until such is produced at the production well, including producing any hydrocarbon fluids that may become available at the said production well in said injection process.

7. A process as in claim 1 wherein the polymer solution is injected into said formation until it is detectable at the production well, including therebefore clearing the injection well equipment, borehole and borehole sand face of any acidic residue therein and, thereafter, following the injection of one of acid and $CO_2$,
    injecting a drive fluid selected from the group consisting of a polymer solution, acidic water, water, brine, air, oxygen, nitrogen, flue gas, micellar solution and $CO_2$ and producing hydrocarbon fluids at the production well.

8. A process as in claim 1 including injecting the said acidic water into said formation until it is detectable at the production well and thereafter injecting the polymer solution until it is detectable at the production well, and producing any hydrocarbon fluids in the meantime that become available at the production well, said process including:
    clearing the injection well equipment, borehole and wellbore sand face of any substantial acid residue therein before the polymer solution injection.

9. A process as in claim 1 wherein the acidic water and alkaline polymer solution are injected into said hydrocarbon bearing formation in substantially stoichiometric quantities.

10. A process as in claim 1 including injecting the said acidic water into said hydrocarbon fluid bearing formation until such acid is detectable at the production well, thereafter injecting the polymer solution into said formation until it is also detectable at the production well, producing any oil in the meantime that becomes available at the production well and
    thereafter injecting one of water, brine, acidic water, solubilized polymer and $CO_2$ into said formation and producing hydrocarbon fluids at said production well.

11. A process as in claim 1 including, when the hydrocarbon fluid/water ratio in the production well is unsatisfactory, thereafter carrying out a step (4) comprising injecting an alkaline solution into said formation to solubilize at least some of said gelled polymer and drive same further into the formation from the injection well.

12. A process as in claim 11 including carrying out a step (5) comprising injecting one of a mineral acid, an organic acid and $CO_2$ into the said formation to regel at least some of said moved, alkaline polymer solution.

13. A process as in claim 12 including, after said regelling, injecting a drive fluid selected from the group consisting of water, brine, solubilized polymer, acidic water and carbon dioxide into said injection well and producing hydrocarbon fluids from the said production well.

14. A process as in claim 1 wherein the polymer solution is produced by cultivating bacteria of the genus Cellulomonas, including at least one of ATCC 21399 (Cellulomonas sp.), ATCC 482 (*Cellulomonas flavigena*), (*Cellulomonas uda*) ATCC 491 and ATCC 53703 (*Cellulomonas flavigena* 819).

15. A process as in claim 1 wherein the polymer solution which is reversibly gelable is a solution of polysaccharide polymer produced by cultivating bacteria including at least one of *Alkaligenes faecalis* subsp. *myxogenes* (ATCC 21680), *Alkaligenes faecalis* (ATCC 31749) and *Agrobacterium radiobacter* (ATCC 21679).

16. A process in claim 1 wherein the drive liquid is one of water and brine.

17. A process as in claim 1 wherein the drive fluid is one of air, water, brine, acid water, $CO_2$ and said polymer solution.

18. A process as in claim 1 wherein the polymer solution which is reversibly gelable is an alkaline solution of polysaccharide polymer produced by cultivating bacteria including at least one of *Alkaligenes faecalis* subsp. *myxogenes* (ATCC 2160), *Alkaligenes faecalis* (ATCC 31749), *Agrobacterium radiobacter* (ATCC 21679), Cellulomonas sp. (ATCC 21399), *Cellulomonas flavigena,* (ATCC 482), *Cellulomonas uda* (ATTC 491) and *Cellulomonas flavigena* 819 (ATCC 53703).

19. In a method for the enhanced recovery of hydrocarbon fluids by injection of a flooding fluid into a subterranean hydrocarbon fluid bearing formation through an injection well extending from the surface of the earth into said formation, whereby to displace hydrocarbon fluids within the formation towards at least one production well spaced at a distance away from the said injection well, the improvement which comprises:
   (1) first injecting into the formation through the injection well a quantity of alkaline, reversibly gelable, polymer solution, which solution gels upon one of neutralization and acidification thereof,
   (2) thereafter, second, injecting a quantity of one of acidic water and $CO_2$ into the said formation through the said injection well, whereby to neutralize at least some of said polymer solution in the formation and thus gel same in said formation, and
   (3) thereafter, third, injecting a drive fluid into said injection well and producing hydrocarbon fluids driven thereby from the production well.

20. A process as in claim 19 including recovering hydrocarbon fluids at the production well during the said first injection, as well as the second and third injections.

21. A process as in claim 19 including injecting a quantity of fluid into said formation after the first injection of the reversibly gelable, basic polymer solution thereinto and before the second injection of one of the acidic water and $CO_2$ into said formation operable to substantially clear any polymer solution from the injection equipment, wellbore annulus and wellbore face.

22. A process as in claim 19 wherein said reversibly gelable basic polymer solution is first injected into said formation until it is detectable at the production well and producing hydrocarbon fluids driven thereby at the production well.

23. A process as in claim 19 wherein one of the acidic water and $CO_2$ is injected into said formation until it is detectable at the production well.

24. A process as in claim 19 wherein the polymer solution is first injected into said formation until it is detectable at the production well, and
   thereafter injecting one of said acidic water and $CO_2$ into said formation until such is detectable at the production well.

25. A process as in claim 24 including injecting a quantity of one of water and brine into said injection well after the first polymer solution injection and before the second acidic water injection, whereby to substantially clear the wellbore of alkaline polymer solution.

26. A process as in claim 19 wherein the said reversibly gelable, basic polymer solution, which solution gels upon one of neutralization and acidification thereof, is produced by cultivating at least one of the bacteria of the genus Cellulomonas, such as ATCC 21399 (Cellulomonas sp.) ATCC 482 . (*Cellulomonas flavigena*), ATCC 53703 (*Cellulomonas flavigena* 819) and ATCC 491 *Cellulomonas uda*.

27. A process as in claim 19 wherein the polymer solution which is reversibly gelable is a solution of polysaccharide polymer produced by cultivating bacteria including at least one of *Alkaligenes faecalis* supsp. *myxogenes* ATCC 21680, *Alkaligenes faecalis* (ATCC 31749) and *Agrobacterium radiobacter* (ATCC 21679).

28. A process as in claim 19 wherein the polymer solution which is reversibly gelable is a solution of polysaccharide polymer produced by cultivating bacteria including at least one of *Alkaligenes faecalis* subsp. *myxogenes* (ATCC 21680), *Alkaligenes faecalis* (ATCC 31749), *Agrobacterium radiobacter* (ATCC 21679), Cellulomonas sp. (ATCC 21399), *Cellulomonas flavigena* (ATCC 482), *Cellulomonas flavigena* 819 (ATCC 53703) and *Cellulomonas uda* (ATCC 491).

29. A process as in claim 19 wherein the said drive fluid is one selected from the group consisting of water, brine, acidic water, a polymer solution and $CO_2$.

30. A process as in claim 19 wherein the alkaline polymer solution and acidic water and $CO_2$ are injected into said hydrocarbon bearing formation in substantially stoichiometrically equal quantities.

31. A process as in claim 19 including injecting the said alkaline polymer solution into said formation until it is detectable at the production well, thereafter injecting one of said acidic water and $CO_2$ into said hydrocarbon fluid bearing formation until such is detectable at the production well, and
   thereafter injecting a drive fluid selected from the group consisting of water, brine, acidic water, a polymer solution and $CO_2$ into said formation and producing hydrocarbon fluids at said production wells.

32. A process as in claim 19 including, when the hydrocarbon fluid/water ratio in the production well is unsatisfactory, thereafter injecting an alkaline solution into the said formation to solubilize at least some of the said gelled polymer and drive same further into the formation from the injection well.

33. A process as in claim 32 including thereafter injecting one of a mineral acid, an organic acid and $CO_2$ into the said formation to regel at least some of said moved alkaline polymer solution.

34. A process as in claim 33 including, after said regelling, injecting a drive fluid selected from the group consisting of water, brine, a polymer solution, acidic water and carbon dioxide as a drive fluid into said injection well and producing hydrocarbon fluids from the said production well.

35. In a method for enhanced recovery of hydrocarbon fluids by injection of a flooding fluid into a subterranean hydrocarbon fluid bearing formation through an injection well extending from the surface of the earth into the formation, whereby to displace in situ hydrocarbon fluids within the formation toward at least one production well at a distance from the injection well, the improvement which comprises the following steps:
   Step 1: injecting a quantity of acidic water into the said formation through said injection well, and producing hydrocarbon fluids from said production well;
   Step 2: injecting a quantity of reversibly gelable alkaline polymer solution, which solution gels upon one of neutralization and acidification thereof into said injection well, and producing hydrocarbon fluids from said production well;

Step 3: injecting a drive fluid into said injection well and producing hydrocarbon fluids from said production well;

Step 4: injecting a quantity of acidic water into the said formation through said injection well, and producing hydrocarbon fluids from said production well;

Step 5: injecting a quantity of reversibly gelable, alkaline polymer solution, which solution gels upon one of neutralization and acidification thereof, into said injection well, and producing hydrocarbon fluids from said production well;

Step 6: injecting a drive fluid into said injection well and producing hydrocarbon fluids from said production well.

36. A process as in claim 35 wherein said drive fluid is selected from the group consisting of water, brine, $CO_2$, alkaline polymer solution and acidic water.

37. A process as in claim 35 wherein said drive fluid is selected from the group consisting of acid water, alkaline polymer solution, $CO_2$, water and brine.

38. A process as in claim 35 including injecting a fluid into said formation after each acidic water injection thereinto and before at least one of the polymer solution injections thereinto, whereby to clear the wellbore, the injection equipment therein and the formation peripheral face in the wellbore of acid to minimize gelling therewithin when the polymer solution injection follows.

39. A process as in claim 35 wherein the said acidic water, is, in at least one of the injections thereof, injected into said formation until it is detectable at the production well, including producing hydrocarbon fluids at the latter in said process;

and wherein the polymer solution, in at least one of the injections thereof, is injected into the said formation until it is detectable at the production well, including producing hydrocarbon fluids at the production well in said process.

40. A process as in claim 35 wherein the polymer solution is injected (step 2) in the formation until it is detectable at the production well, including therebefore injecting a fluid into the injection well to clear the injection well equipment, borehole annulus and well bore face of acidic solution, thereafter continuing injecting said polymer solution so long as oil is efficiently produced at the production well; and thereafter injecting said acidic water (step 4) into said formation until it is again detectable at the production well and producing any oil made available thereby thereat and, yet thereafter, again injecting the polymer solution (step 5) until it is detectable at the production well and producing oil in the meantime at the production well, said process including injecting a fluid into said formation operative to clear the injection well borehole annulus, injection equipment and wellbore face before each alkaline polymer solution injection.

41. A process as in claim 40 including the steps of repeating sequential injection of acidic water into said formation and thereafter injection of polymer solution in said wellbore until the process fails to produce substantial additional hydrocarbon fluids in the formation at the production well.

42. A process as in claim 35 wherein a plurality of production wells are positioned relatively adjacent the injection well, whereby acidic water and polymer containing solution each may be detected at more than one location and oil may be produced at more than one production location.

43. A process as in claim 35 wherein the polymer solution which is reversibly gelable in the oil formation is a solution of a polysaccharide polymer produced by cultivating bacteria of the genus Cellulomonas, including at least one of ATCC 21399 (Cellulomonas sp.), ATCC 482 (*Cellulomonas flavigena*) and ATCC 53703 (*Cellulomonas flavigena* 819) in a suitable solubilizing medium.

44. A process as in claim 35 wherein the polymer solution which is reversibly gelable in the oil formation is a solution of a polysaccharide polymer produced by cultivating bacteria including at least one of *Alkaligenes faecalis* subsp. *myxogenes* (ATCC 21680), *Alkaligenes faecalis* (ATCC 31749) and *Agrobacterium radiobacter* (ATCC 21679).

45. A process as in claim 35 wherein the polymer solution which is reversibly gelable is a solution of polysaccharide polymer produced by cultivating bacteria including at least one of *Alkaligenes faecalis* subsp. *myxogenes* (ATCC 21680), *Alkaligenes faecalis* (ATCC 31749), *Agrobacterium radiobacter* (ATCC 21679), ATCC 21399 Cellulomonas sp. ATCC 482 (*Cellulomonas flavigena* and ATCC 53703 (*Cellulomonas flavigena* 819 in a suitable solubilizing medium.

46. In a method of producing enhanced recovery of hydrocarbon fluids by the injection of a flooding fluid into a subterranean hydrocarbon fluid bearing formation through an injection well extending from the surface of the earth into the formation, to displace in situ hydrocarbon fluids from the formation towards at least one production well at a distance from the injection well, the improvement which comprises:

(1) first injecting a substantial quantity of acidic water into the surrounding formation through said injection well, said quantity insufficient to be detected at the production well;

(2) thereafter, second, injecting another substantial quantity of reversibly gelable, alkaline polymer solution, which solution gels upon one of neutralization and acidification thereof, into said injection well, (3) with respect to each said first and second sequential injections into the formation, producing any additionally available hydrocarbon fluids at the production well;

(4) thereafter injecting (third) a further quantity of reversibly gelable alkaline polymer solution, which solution gels upon one of neutralization and acidification thereof, into said injection well in substantial quantity and (5) next injecting (fourth) a comparable quantity of acidic water into the said formation through the said injection well whereby to gel, upon one of neutralization and acidification thereof, at least some of any yet ungelled, gelable, alkaline polymer solution, and producing hydrocarbon fluids at the production well.

47. A process as in claim 46 including, further, repeatedly alternatively injecting, first, a quantity of acidic water into the formation through the injection well, and, thereafter, second, injecting a further quantity of reversibly gelable alkaline polymer solution, which solution gels upon one of neutralization and acidification thereof, into said injection well until additional hydrocarbon fluids cease to be produceable in commercial quantities at the production well.

48. A process as in claim 47 including, after each sequential injection of a quantity of acidic water and a quantity of reversibly gelable, alkaline polymer solution into the injection well, injecting a drive fluid into said well and producing hydrocarbon fluids from the production well.

49. A process as in claim 46 including injecting a fluid into said formation between sequential acidic water injections and polymer solution injections to clear the well bore annulus, the injection equipment and the well bore face of the last injected.

50. A process as in claim 46 wherein the polymer solution which is reversibly gelable is a solution of a polysaccharide polymer produced by cultivating bacteria of the genus Cellulomonas, including at least one of ATCC 21399 (Cellulomonas sp.), ATCC 482 (*Cellumonas flavigena*) ATCC 491 (*Cellulomonas uda*) and ATCC 53703 (*Cellulomonas flavigena* 819) in a solubilizing medium.

51. A process as in claim 46 wherein the polymer solution which is reversibly gelable is an alkaline solution of polysaccharide polymer produced by cultivating bacteria including at least one of *Alkaligenes Faecalis* subsp. *myxogenes* (ATCC 21680), *Alkaligenes faecalis* (ATCC 31749) and *Agrobacterium radiobacter* (ATCC 21679).

52. In a method for the enhanced recovery of hydrocarbon fluids by injection of a flooding fluid into a subterranean, hydrocarbon fluids bearing formation through at least one injection well extending from the surface of the earth into the formation, to displace hydrocarbon fluids within the formation towards at least one production well spaced away a substantial distance from said injection well, the improvement which comprises:

(1) first injecting into the formation through the injection well a quantity of reversibly gelable alkaline polymer solution, which solution gels upon one of neutralization and acidification thereof, (2) thereafter, second, injecting one of a quantity of acidic water and $CO_2$ into the said formation through the said injection well whereby to at least neutralize some of said polymer solution in the formation thereby to gel same in said formation, (3) further injecting (third) a second quantity of alkaline, reversibly gelable, polymer solution, which solution gels upon one of neutralization and acidification thereof, and (4) thereafter injecting (fourth) a quantity of one of acidic water and $CO_2$ into the formation through the said injection well whereby to neutralize at least some of said polymer solution in the formation and gel same while in the formation, and (5) producing hydrocarbon fluids at said production well.

53. A method as in claim 52 wherein a drive liquid is injected into said injection well after each completion of the first and second polymer/acid water injections, the steps second and fourth, and producing hydrocarbon fluids at the production well.

54. A process as in claim 52 including injecting a fluid into said formation after each injection of the reversibly gelable basic polymer solution, first and third, and also after each injection of the acidic water into the said formation, second and fourth such fluid injection being operable at least to clean out from the injection well injection equipment, the wellbore annulus of the injecting well and the immediately surrounding wellbore face the preceding reactant, thus to prevent gellation in any one of the wellbore equipment, the wellbore annulus and on the wellbore face.

55. A process as in claim 52 wherein the said reversibly gelable, basic, polymer solution, which solution gels upon one of neutralization and acidification thereof, is produced by cultivating at least one of the bacteria of the genus Cellulomonas, such as ATCC 21399 (Cellulomonas sp.) ATCC 482 (*Cellulomonas flavigena*), ATCC 53703 (*Cellulomonas flavigena* 819) ATCC and *Cellulomonas uda.*

56. A process as in claim 55 including continued alternate injections of said polymer and said acid water or $CO_2$ into said injection well until additional hydrocarbon fluids cease to be produceable in commercial quantities at the production well.

57. A process as in claim 52 including injecting a drive fluid into said injection well and producing hydrocarbon fluids from said production well between the second and third injections.

58. A process as in claim 57 wherein said drive fluid is one of air, water, brine, carbon dioxide, alkaline polymer solution and acidic water.

59. A process as in claim 52 including the step of injecting a drive fluid into said injection well after the fourth injection.

60. A process as in claim 59 wherein said drive fluid is selected from the group consisting of water, brine, carbon dioxide, alkaline polymer solution and acidic water.

61. A process as in claim 52 wherein the polymer solution which is reversibly gelable is an alkaline solution of polysaccharide polymer produced by cultivating bacteria including at least one of *Alkaligenes Faecalis* subsp. *myxogenes* (ATCC 21680), *Alkaligenes faecalis* (ATCC 31749) and *Agrobacterium radiobacter* (ATCC 21679).

62. A process as in claim 52 wherein said drive fluid is one of air, water, brine, carbon dioxide, alkaline polymer solution and acidic water.

63. A process as in claim 52 including continuing said polymer injection until the said polymer solution is detectable at the production well.

64. A process as in claim 63 wherein the said injection of one of a quantity of acidic water and carbon dioxide into the formation through the said injection well is continued until such is detectable at the production well.

65. A process as in claim 52 wherein each of the four injections are continued until the specific fluid injected is detected at the production well.

66. A process as in claim 52 including the steps of repeating sequential injection of alkaline polymer solution into said formation and thereafter injection of one of acidic water and $CO_2$ until the processes fail to produce substantial additional hydrocarbon fluids in the formation at the production well.

67. A process as in claim 52 wherein the polymer solution which is reversibly gelable in the oil formation is a solution of polysaccharide polymer produced by cultivating bacteria, including at least one of ATCC 21399 (Cellulomonas sp.) ATCC 482 (*Cellulomonas flavigena,* ATCC 491 (Cellulomonas uda), ATCC 53703 (*Cellulomonas flavigena* 819) ATCC 21680 (*Alkaligenes faecalis myxogenes,* ATCC 31749 (*Alkaligenes faecalis*) and ATCC 21679 (*Agrobacterium radiobacter*).

68. In a method for enhanced recovery of hydrocarbon fluids by the injection of at least one flooding fluid into a subterranean hydrocarbon fluid bearing formation through an injection well extending from the surface of the earth into the formation, whereby to displace in situ hydrocarbon fluids from the formation toward at least one production well spaced at a distance away from the said injection well, the improvement which comprises:
- (1) first injecting a substantial quantity of acidic water into said formation through said injection well,
- (2) thereafter injecting into said formation a quantity of reversibly gelable, water insoluble, alkaline beta 1,3 polyglucan homopolymer solution, which solution gels immediately upon one of neutralizing and acidification thereof into said injection well and
- (3) producing at least some hydrocarbon fluids from the said production well.

69. A process as in claim 68 including clearing the injection equipment, well bore annulus and well bore face of acidic water before injecting the said alkaline polymer solution.

70. A process as in claim 68 wherein the said acidic water is injected into said formation until it is detectable at the production well, including producing any oil that becomes available at the latter in said injection process.

71. A process as in claim 70 wherein the polymer solution is injected into the said formation until it is detectable at the production well, including producing any hydrocarbon fluids that may become available at the production well in said injection process.

72. A process as in claim 71 including, when the hydrocarbon fluid/water ratio at the production well is unsatisfactory, thereafter injecting an alkaline solution into said formation to solubilize at least some of said gelled polymer and drive same further into the formation from the injection well.

73. A process as in claim 72 including injecting one of a mineral acid, an organic acid and carbon dioxide into the said formation to regel at least some of said moved, alkaline polymer solution.

74. A process as in claim 73 including, after said regelling, injecting a drive fluid selected from the group consisting of water, brine, solubilized polymer, acidic water and carbon dioxide into said injection well and producing hydrocarbon fluids from the said production well.

75. A process as in claim 68 wherein the polymer solution which is reversibly gelable is an alkaline solution of polysaccharide polymer produced by cultivating bacteria including at least one of *Alkaligenes faecalis* subsp. *myxogenes* (ATCC 2160), *Alkaligenes faecalis* (ATCC 31749), *Agrobacterium radiobacter* (ATCC21679), Cellulomonas sp. (ATCC 21399), *Cellulomonas flavigena* (ATCC 482), *Cellulomonas uda* (ATCC 491) and *Cellulomonas flavigena* (ATCC 53703).

76. In a method for the enhanced recovery of hydrocarbon fluids by injection of a flooding fluid into a subterranean hydrocarbon fluid bearing formation through an injection well extending from the surface of the earth into said formation, whereby to displace hydrocarbon fluids within the formation toward at least one production well spaced at a distance away from said injection well, the improvement which comprises:
- (1) first injecting into the formation through the injection well a quantity of reversibly gelable, water insoluble, alkaline beta 1,3 polyglucan homopolymer solution, which solution gels immediately upon one of neutralization and acidification thereof,
- (2) thereafter, second, injecting a quantity of one of acidic water and $CO_2$ into the said formation through the said injection well, whereby to neutralize at least some of said polymer solution in the formation and thus gel same in said formation, and
- (3) producing hydrocarbon fluid from the production well.

77. A process as in claim 76 including injecting a quantity of fluid into said formation after the first injection of the basic polymer solution and before the second injection of one of acidic water and carbon dioxide, such third injected fluid operable to substantially clear any polymer solution from the injection equipment, well bore annulus and well bore face.

78. A process as in claim 76 wherein said reversibly gelable basic polymer solution is injected into said formation until it is detectable at the production well and producing hydrocarbon fluids driven thereby at the production well.

79. A process as in claim 78 including further injecting said reversibly gelable basic polymer solution at said injection well so long as hydrocarbon fluids are economically produced thereby at the production well.

80. A process as in claim 76 wherein one of the acidic water and $CO_2$ is injected into said formation until such is detectable at the production well.

81. A process as in claim 76 wherein the polymer solution which is reversibly gelable is a solution of polysaccharide polymer produced by cultivating bacteria including at least one of *Alkaligenes faecalis* subsp. *myxogenes* (ATCC 21680), *Alkaligene faecalis* (ATCC 31749), *Agrobacterium radiobacter* (ATCC 21679), Cellulomonas sp. (ATCC 21399), *Cellulomonas flavigena* (ATCC 482), *Cellulomonas flavigena* 819 (ATCC 53703) and *Cellulomonas uda* (ATCC 491).

82. A process as in claim 76 wherein the alkaline polymer solution and acidic water and $CO_2$ are injected into said hydrocarbon bearing formation in substantially stoichiometrically equal quantities.

83. A process as in claim 76 including, when the hydrocarbon fluid/water ratio and the production well is unsatisfactory, thereafter injecting an alkaline solution into said formation to solubilize at least some of the said gelled polymer and drive same further into the formation from the injection well.

84. A process as in claim 83 including thereafter injecting one of a mineral acid, an organic acid and $CO_2$ into the said formation to regel at least some of the said moved alkaline polymer solution.

85. A process as in claim 84, after said regelling, injecting a drive fluid selected from the group consisting of water, brine, solubilized polymer, acidic water and carbon dioxide into said injection well and producing hydrocarbon fluids from the said production well.

86. The method of selectively sealing relatively more permeable, undesirable, fluid passing porous sand strata in an earth formation exposed to an input well of an artificial, fluid drive, secondary recovery hydrocarbon fluid producing system without sealing off less permeable, desirable, fluid less passing strata exposed to the input well, comprising the steps of:
- (1) stopping the fluid drive into said input well;
- (2) injecting into said input well an alkaline solution of reversibly gelling polysaccharide polymer, whereby the said polymer containing solution preferentially flows into the pores of the more permeable, undesirable fluid passing, porous sand strata and not preferentially into the pores of the less permeable, desirable, initially fluid nonpassing sand strata;

(3) subsequently injecting one of a mineral acid, an organic acid and $CO_2$ to neutralize the initially injected alkaline polymer solution, such neutralizing resulting in precipitating of at least some of the said polymer in said pores of the more permeable, less desirable, fluid passing strata, thus to at least partially seal off said last strata and at least partially confine further fluid injection into the less permeable, more desirable, initially fluid nonpassing, porous sand strata; and (4) reinstituting the fluid drive into the said input well utilizing one of air, water, brine, acidic water, alkaline polymer solution and $CO_2$.

87. A process as in claim 86 wherein the precipitated polysaccharide polymer is thereafter at least partially resolubilized in the sand strata by injecting into said input well one of sodium hydroxide, potassium hydroxide and solubilized polymer in alkaline solution.

88. A process as in claim 87 wherein, after further fluid drive, the resolubilized polymer solution is re-precipitated in said sand strata by the injection of one of a mineral acid, an organic acid and $CO_2$ to the formation.

89. A process as in claim 88 wherein the fluid drive into said input well is again started, utilizing a drive fluid selected from the group consisting of water, brine, acid water, solubilized polymer and $CO_2$.

90. The method of selectively sealing relatively more permeable, undesirable, fluid passing, porous sand strata in an earth formation exposed to an input well of an artificial, fluid drive, secondary recovery, hydrocarbon fluid producing system without sealing off less permeable, more desirable, fluid-nonpassing sand strata exposed to the input well, comprising the steps of:

(1) stopping the fluid drive into the said input well;

(2) injecting one of a mineral acid and an organic acid into said input well, whereby said acid injection is preferentially received in the said relatively more permeable, undesirable, fluid-passing porous sand strata;

subsequently injecting into said input well an alkaline solution of a reversibly gelling polysaccharide polymer, whereby at least some of the polymer is precipitated at least in the outer pores of the said more permeable, undesirable, fluid passing, porous sand strata, thus to at least partially seal off said last strata and at least partially confine further fluid injection into the less permeable, more desirable, initially fluid nonpassing, porous sand strata;

(4) and reinstituting the fluid drive into the said input well, utilizing at least one of water, brine, acid water, solubilized alkaline polymer solution and $CO_2$.

91. A process as in claim 90 wherein the precipitated polysaccharide polymer is thereafter at least partially resolubilized in the said sand strata by injecting into said input well at least one of sodium hydroxide, potassium hydroxide and solubilized alkaline polymer solution.

92. A process as in claim 91 wherein, after further fluid drive, the polymer solution is reprecipitated in said sand strata by addition of one of a mineral acid, an organic acid and $CO_2$ to the strata.

93. A process as in claim 92 wherein, thereafter, fluid drive through said input well is restarted, the drive fluid selected from the group consisting of water, brine, acidic water, solubilized polymer solution and $CO_2$.

94. A method for carrying out a secondary recovery crude oil recovery operation from a crude oil and water containing earth formation, wherein fluid is injected through a fluid input well and then into the oil and water bearing formation in a fluid drive, such producing an oil and water flow into an oil output well, said oil and water being produced from said output well, comprising:

(1) stopping any fluid drive into said input well;

(2) injecting a reversibly gelable, solubilized polysaccharide polymer in an alkaline medium into said input well and thence into at least some of the water-wet portions of said formation, whereby the said solubilized polymer solution primarily contacts pore surfaces of the water-wet portions of the formation, (3) while said latter portion of said formation is wet with said polymer solution, injecting one of acidic water and carbon dioxide into said formation through said input well to at least partially precipitate some of said polymer in said water wet formation portion and (4) reinstituting said fluid drive at said input well and producing oil and water from said output well in said crude oil recovery operation, said oil and water being produced in a higher oil to water ratio than prior to injection of the said alkaline medium polymer solution into said formation.

95. A method for carrying out a crude oil secondary recovery operation from a crude oil and water containing earth formation, wherein fluid is injected through a fluid input well and then into the oil and water bearing formation, such producing an oil and water flow into an oil output well, said oil and water being produced from said output well, comprising:

(1) stopping any fluid drive into said input well (2) injecting acidic water into said input well and thence into at least some of the water-wet portions of said formation, whereby the said acidic water primarily contacts pore surfaces of the water-wet portions of the formation, (3) while said latter portion of said formation is wet with said acidic water solution, injecting a reversibly gelable, solubilized polysaccharide polymer in an alkaline medium into said input well to at least partially precipitate some of said polymer in said water wet formation portions; and (4) reinstituting said fluid drive at said input well and producing oil and water from said output well in said crude oil recovery operation, said oil and water being produced in a higher oil to water ratio than prior to injection of said acidic water into said formation.

96. A process of carrying out a fluid drive system in a permeable, porous earth formation body having hydrocarbon fluids therein comprising injecting into said body an alkaline medium containing solubilized, reversibly gelable, water insoluble beta 1,3 polyglucan homopolysaccharide polymer, which solution gels immediately upon one of neutralization and acidification thereof, and recovering hydrocarbon fluids from said body.

97. A process as in claim 96 wherein the polymer solution which is reversibly gelable is a solution of homopolysaccharide polymer produced by cultivating bacteria including at least one of *Alkaligenes faecalis* subsp. *myxogenes* (ATCC 21680), *Alkaligene faecalis* (ATCC 31749), *Agrobacterium radiobacter* (ATCC 21679), Cellulomonas sp. (ATCC 21399), *Cellulomonas flavigena* (ATCC 482), *Cellulomonas flavigena* 819 (ATCC 53703) and *Cellulomonas uda* (ATCC 491).

98. A process of selectively blocking the migration of aqueous fluids in a permeable, porous earth formation body having hydrocarbon fluids therein comprising injecting into said body an alkaline medium containing solubilized, reversibly gelable, polysaccharide polymer and thereafter injecting into said body one of a mineral acid, an organic acid and $CO_2$ to neutralize at least a portion of the former injected polymer solution, such resulting in precipitation of at least some of the polymer from the solution in the body.

99. A process of selectively blocking the migration of fluids in a permeable, porous, earth formation body having hydrocarbon fluids therein comprising injecting into said body one of a mineral acid and an organic acid and thereafter injecting into said body an alkaline medium containing regelable polysaccharide polymer whereby the latter medium, in at least part thereof, is neutralized by the contact with said acid, such resulting in precipitation of at least some of the said polymer in said body.

100. In the recovery of oil from a reservoir having at least one high permeability zone therein by injecting a drive fluid to displace oil toward a second well, the method comprising the steps of:
(1) injecting as said driving fluid in said first well an alkaline solution of regelable polysaccharide polymer until the drive fluid containing said polymer breaks through into the second well,
(2) producing oil from the second well until said solution breaks into the second well,
(3) terminating the injection of fluid into said first well,
(4) introducing into the reservoir from the second well one of a mineral acid, an organic acid and $CO_2$ which will neutralize at least part of the said driving fluid and precipitate at least some of said polymer within said reservoir and
(5) thereafter injecting a driving fluid into one of said wells comprising one of water, brine, acidic water, solubilized polymer solution and $CO_2$ and producing oil from the other said well.

101. In the recovery of oil from a reservoir having at least one high permeability zone therein by injecting a driving fluid into a first well to displace oil toward a second well, the method comprising the steps of:
(1) injecting a first driving fluid of acidic water into said first well;
(2) producing oil from the second well until the acidic driving fluid breaks through into the second well,
(3) terminating the injection of fluid into the first well;
(4) introducing into the reservoir from said second well an alkaline medium in which there is solubilized, regelable polysaccharide polymer, whereby to precipitate at least some of said polymer from said alkaline medium upon neutralization thereof by contact with said previously injected acidic driving fluid and
(5) thereafter injecting a driving fluid comprising one of water, brine, acidic water, solubilized polymer and $CO_2$ into one of said wells and
(6) producing oil from the other of said wells.

102. A method of selectively plugging earth formations with a gel-like precipitate of a regelable polysaccharide polymer comprising the steps of:
(1) injecting into the formation an alkaline medium containing regellable, solubilized polysaccharide polymer; and
(2) thereafter injecting into said formation one of a mineral acid, an organic acid and $CO_2$ whereby to precipitate at least a portion of said polysaccharide polymer in said earth formation.

103. A method of selectively plugging earth formations with a gel-like precipitate of regelable polysaccharide polymer comprising the steps of:
(1) injecting into the formation a quantity of one of a mineral acid and an organic acid; and
(2) thereafter injecting into said formation an alkaline medium containing regelable, solubilized polymer, whereby to precipitate at least a portion of said polysaccharide polymer in the said earth formation.

104. A process for recovering crude oil from a subterranean oil formation, which comprises injecting into said formation through an input well communicating with said formation an alkaline flooding medium having dissolved therein a reversibly gelable, water insoluble beta 1,3 polyglucan homopolysaccharide polymer, which solution gels immediately upon one of neutralization and acidification thereof whereby oil is displaced in the formation toward at least one output well communicating with the same formation.

105. A method for recovering oil from heterogeneous oil bearing formations penetrated by an injection well and a spaced production well, which comprises:
selectively readjusting the permeability of the said formations by introducing thereinto through said injection well, in sequence:
a solution of a first reactant material;
a solution of a second reactant material that reacts with said first reactant material, on contact therebetween in the formation, to produce a plugging precipitate at least at the interface between said injected solutions; and
the plugging precipitate being resolubilizable upon introducing into said formation a solution of at least one component of one of said reactant materials.

* * * * *